US011224073B2

(12) United States Patent
Tsai et al.

(10) Patent No.: US 11,224,073 B2
(45) Date of Patent: Jan. 11, 2022

(54) BEAM TRAINING AND INITIAL ACCESS

(71) Applicant: CONVIDA WIRELESS, LLC, Wilmington, DE (US)

(72) Inventors: Allan Y. Tsai, Boonton, NJ (US); Guodong Zhang, Woodbury, NY (US); Qing Li, Princeton Junction, NJ (US); Lakshmi R. Iyer, King of Prussia, PA (US); Pascal M. Adjakple, Great Neck, NY (US); Joseph M. Murray, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/495,570

(22) PCT Filed: Mar. 22, 2018

(86) PCT No.: PCT/US2018/023749
§ 371 (c)(1),
(2) Date: Sep. 19, 2019

(87) PCT Pub. No.: WO2018/175714
PCT Pub. Date: Sep. 27, 2018

(65) Prior Publication Data
US 2020/0112993 A1    Apr. 9, 2020

Related U.S. Application Data

(60) Provisional application No. 62/475,744, filed on Mar. 23, 2017.

(51) Int. Cl.
*H04W 74/08* (2009.01)
*H04W 76/11* (2018.01)
(Continued)

(52) U.S. Cl.
CPC ...... *H04W 74/0833* (2013.01); *H04B 7/0617* (2013.01); *H04L 5/0048* (2013.01);
(Continued)

(58) Field of Classification Search
CPC .................................................. H04W 74/0833
See application file for complete search history.

(56) References Cited

U.S. PATENT DOCUMENTS

| 5,905,443 A | 5/1999 | Olds et al. |
| 2014/0128092 A1* | 5/2014 | Xiong ............... H04W 88/06 455/454 |

(Continued)

FOREIGN PATENT DOCUMENTS

| CN | 108282861 A | 7/2018 |
| EP | 3577935 A1 | 12/2019 |

(Continued)

OTHER PUBLICATIONS

3GPP TR 38.913 V0.2.0, "3rd Generation Partnership Project; Technical Specification Group Radio Access Network Study on Scenarios and Requirements for Next Generation Access Technologies; (Release 14)", Feb. 2016, 19 pages.

(Continued)

*Primary Examiner* — John D Blanton
(74) *Attorney, Agent, or Firm* — BakerHostetler

(57) ABSTRACT

The present application is at least directed to an apparatus. The apparatus includes a non-transitory memory including instructions stored thereon for beam link pairing the apparatus to a router in a new radio. The apparatus also includes a processor, operably coupled to the non-transitory memory, capable of executing the instructions of transmitting physical random access channel (PRACH) preambles through a set of uplink transmission beams in a subframe. The processor is also capable of executing the instructions of
(Continued)

signaling a beam ID of the set of uplink transmission beams. The processor is further capable of executing the instructions of monitoring a physical downlink control channel (PDCCH) for a random access response (RAR) including a random access radio network temporary identifier (RA-RNTI). The processor is even further capable of executing the instructions of determining the RA-RNTI corresponds to the transmitted PRACH preambles.

14 Claims, 21 Drawing Sheets

(51) Int. Cl.
| | |
|---|---|
| *H04B 7/06* | (2006.01) |
| *H04W 56/00* | (2009.01) |
| *H04W 72/00* | (2009.01) |
| *H04W 72/04* | (2009.01) |
| *H04L 5/00* | (2006.01) |
| *H04L 27/26* | (2006.01) |
| *H04W 68/02* | (2009.01) |

(52) U.S. Cl.
CPC ...... *H04L 27/2613* (2013.01); *H04L 27/2675* (2013.01); *H04W 56/001* (2013.01); *H04W 68/025* (2013.01); *H04W 72/005* (2013.01); *H04W 72/042* (2013.01); *H04W 72/046* (2013.01); *H04W 76/11* (2018.02)

(56) References Cited

U.S. PATENT DOCUMENTS

| | | | |
|---|---|---|---|
| 2014/0204836 A1 | 7/2014 | Johansson et al. | |
| 2014/0376466 A1 | 12/2014 | Cheol et al. | |
| 2015/0382205 A1* | 12/2015 | Lee | H04W 16/28 370/329 |
| 2016/0352403 A1* | 12/2016 | Kishiyama | H04B 7/0695 |
| 2016/0353424 A1* | 12/2016 | Stirling-Gallacher | H04B 7/0626 |
| 2017/0026102 A1 | 1/2017 | Guo et al. | |
| 2017/0231011 A1* | 8/2017 | Park | H04W 74/006 |
| 2017/0311276 A1 | 10/2017 | Tsai et al. | |
| 2017/0332359 A1 | 11/2017 | Tsai et al. | |
| 2017/0366236 A1 | 12/2017 | Ryoo et al. | |
| 2018/0176710 A1* | 6/2018 | Jang | H04W 72/1215 |
| 2018/0213452 A1 | 7/2018 | Kim et al. | |
| 2018/0227035 A1* | 8/2018 | Cheng | H04B 7/0695 |
| 2018/0242231 A1 | 8/2018 | Reial et al. | |
| 2018/0323848 A1* | 11/2018 | Mizusawa | H04W 16/28 |
| 2019/0158337 A1* | 5/2019 | Yoon | H04L 27/2666 |
| 2019/0200306 A1 | 6/2019 | Ko et al. | |
| 2019/0208570 A1* | 7/2019 | Shrivastava | H04W 68/00 |
| 2019/0327710 A1 | 10/2019 | Liu et al. | |
| 2019/0342896 A1* | 11/2019 | Kusashima | H04W 72/121 |
| 2019/0380099 A1 | 12/2019 | Hakola et al. | |
| 2020/0045735 A1 | 2/2020 | Kim et al. | |
| 2020/0053607 A1* | 2/2020 | Ingale | H04L 5/005 |
| 2020/0221427 A1 | 7/2020 | Nilsson et al. | |

FOREIGN PATENT DOCUMENTS

| | | |
|---|---|---|
| KR | 10-2017-0029284 A | 3/2017 |
| WO | 2017/022902 | 2/2017 |
| WO | 2018/128503 A1 | 7/2018 |
| WO | 2018/144873 A1 | 8/2018 |

OTHER PUBLICATIONS

3GPP TSG RAN WG1 #85 R1-164013, Samsung, "Framework for beamformed access", May 2016, 4 pages.
3GPP TSG-RAN WG2 Meeting #97, R2-1701331, MediaTek Inc., "Paging in NR with Beam Sweeping" Feb. 2017, 4 pages.
Author Unknown, Considerations on Paging Transmission, Doc. No. R1-1611277, pp. 1-5, Nov. 14-18, 2016.
Author Unknown, NR paging channel design, Doc. No. R1-1612458, pp. 1-4, Nov. 18, 2016.
Author Unknown, Paging in NR, Doc. No. R2-1700823, pp. 1-6, Feb. 17, 2017.

* cited by examiner

BEAM TRAINING AND INITIAL ACCESS

CROSS-REFERENCE TO RELATED APPLICATIONS

This application is the National Stage Application of International Patent Application no. PCT/US2018/023749 filed Mar. 22, 2018, which claims the benefit of priority of U.S. Provisional Patent Application Ser. No. 62/475,744 filed Mar. 23, 2017, titled "Beam Training and Initial Access," the contents of which is incorporated by reference in its entirety.

FIELD

The present application is directed to apparatuses and methods for beam training and initial access in new radio

BACKGROUND

New radio (NR) is the next evolutionary step from 3G and 4G wireless networks. At its core, NR intends to make wireless broadband performance substantially similar to that of wirelines. NR is also working on efficiently connecting Internet of Things (IoT) devices for reliable and safe communications.

NR supports both low frequency NR (LF-NR), i.e., sub 6 GHz, and high frequency NR (HF-NR), i.e., above 6 GHz deployment. In LF-NR, a single wider beam may be sufficient for coverage. To the contrary, a single wider beam may be insufficient for coverage in HF-NR. This is attributed to significant attenuation at very high frequency. As a result, multiple narrow beams are preferred for enhancing coverage in HF-NR.

SUMMARY

This summary is provided to introduce a selection of concepts in a simplified form that are further described below in the Detailed Description. This Summary is not intended to limit the scope of the claimed subject matter.

One aspect of the disclosure is directed to an apparatus in new radio. The apparatus includes a non-transitory memory including instructions stored thereon for beam link pairing the apparatus to a router in the new radio. The apparatus also includes a processor, operably coupled to the non-transitory memory, capable of executing the instructions of transmitting physical random access channel (PRACH) preambles through a set of uplink transmission beams in a subframe. The processor is also capable of executing the instructions of signaling a beam ID of the set of uplink transmission beams. The processor is further capable of executing the instructions of monitoring a physical downlink control channel (PDCCH) for a random access response (RAR) including a random access radio network temporary identifier (RA-RNTI). The processor is even further capable of executing the instructions of determining the RA-RNTI corresponds to the transmitted PRACH preambles.

Another aspect of the disclosure is directed to an apparatus. The apparatus includes a non-transitory memory including instructions stored thereon for beam link adjustments in the new radio. The apparatus also includes a processor, operably coupled to the non-transitory memory, capable of executing the instructions of detecting downlink transmission beams transmitted from gNB. The processor is also capable of executing the instructions of performing downlink measurements for the detected downlink transmission beam. The processor is further capable of executing the instructions of selecting a first downlink transmission beam based on the measurement. The processor is even further capable of executing the instructions of calculating a downlink path loss using a downlink reference signal of the first downlink transmission beam. The processor is even further capable of executing the instructions of estimating an initial uplink transmit power based on the calculated downlink path loss. Still further, the processor is capable of executing the instructions of transmitting, to the gNB, an indication of the first downlink transmission beam with the estimated initial uplink transmit power.

Yet another aspect of the disclosure is directed to an apparatus in new radio. The apparatus includes a non-transitory memory including instructions stored thereon for beam link adjustments in the new radio. The apparatus also includes a processor, operably coupled to the non-transitory memory, capable of executing the instructions of sending, to a gNB, uplink transmission beams via uplink transmission beam sweeping with an initial uplink transmit power. The processor is also capable of executing the instructions of receiving, from the gNB, an indication of a first uplink transmission beam from the sent uplink transmission beams, and an uplink path loss or uplink transmit power adjustment information. The processor is further capable of executing the instructions of calculating a beam pair link gain difference based on a downlink path loss and the received uplink path loss or uplink transmit power adjustment information. The processor is even further capable of executing the instructions of adjusting the initial uplink transmit power based upon the calculation.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
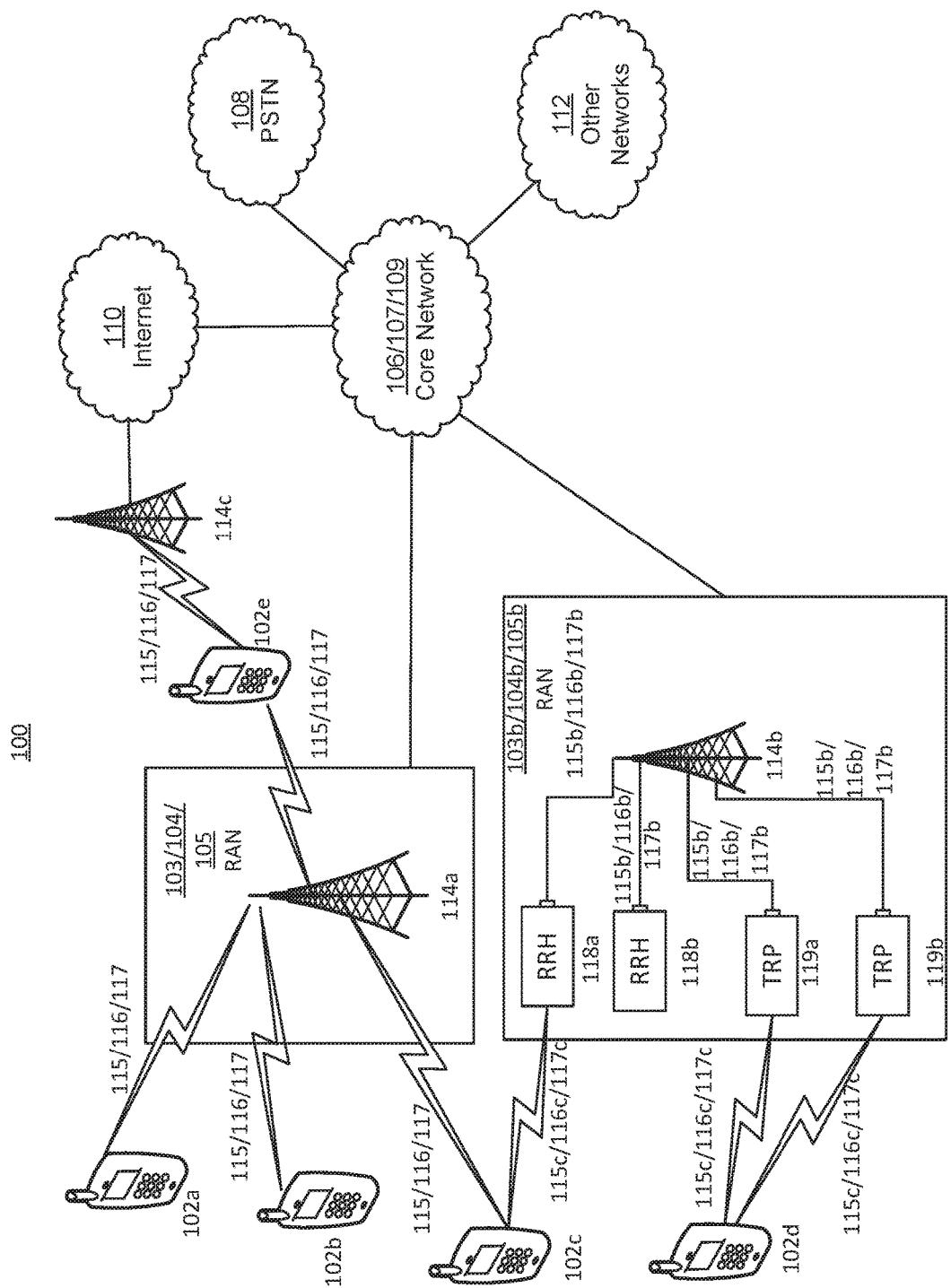
FIG. 1A illustrates an exemplary communications system according to an embodiment of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

In an aspect of the disclosure, user equipment (UE) procedures for beam link pairing at initial access are described.

Yet another aspect of the disclosure, in relation to UEs in a connected state, describes multiple sets of channel state information reference signals (CSI-RSs) allocated and configured to perform beam paring operations by an UE.

Definitions and Acronyms

Provided below are definitions for terms and phrases commonly used in this application in Table 1.

TABLE 1

| Acronym | Term or Phrase |
|---|---|
| A/N | Ack/Nack |
| BRS | Beam Reference Signal |
| CE | Control Element |
| CQI | Channel Quality Indicator |
| DL | Downlink |
| DRX | Discontinuous Reception |
| eMBB | enhanced Mobile Broadband |
| ETWS | Earthquake and Tsunami Warning System |
| HARQ | Hybrid Automatic Repeat Request |
| KPI | Key Performance Indicators |
| LTE | Long Term Evolution |
| MAC | Medium Access Control |

TABLE 1-continued

| Acronym | Term or Phrase |
|---|---|
| MIB | Master Information Block |
| mMTC | massive Machine Type Communication |
| NACK | Non-ACKnowledgement |
| NR | New Radio |
| PBCH | Physical Broadcast Channel |
| PDCCH | Physical Downlink Control Channel |
| PDSCH | Physical Downlink Shared Data Channel |
| PRACH | Physical Random Access Channel |
| PRB | Physical Resource Block |
| RAN | Radio Access Network |
| RNTI | Radio Network Temporary Identifier |
| P-RNTI | Paging Radio Network Temporary Identifier |
| RRC | Radio Resource Control |
| RSRP | Reference Signal Received Power |
| RSSI | Received Signal Strength Indicator |
| SI | System Information |
| SIB | System Information Block |
| TDD | Time Division Duplex |
| TPC | Transmit Power Control |
| UE | User Equipment |
| UL | Uplink |
| URLLC | Ultra-Reliable and Low Latency Communications |

General Architecture

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called NR, which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to include a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA20001×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
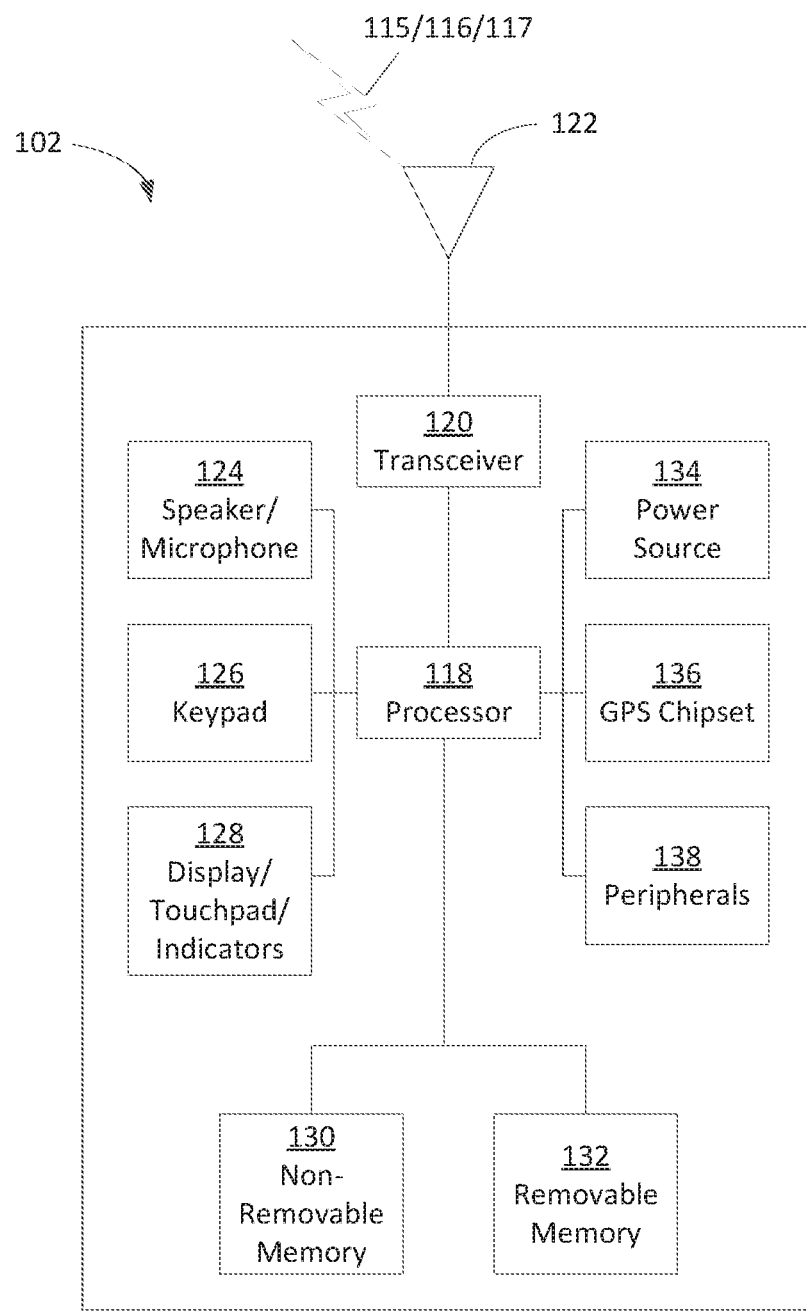
FIG. 1B illustrates an exemplary apparatus configured for wireless communication according to an embodiment of the application.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
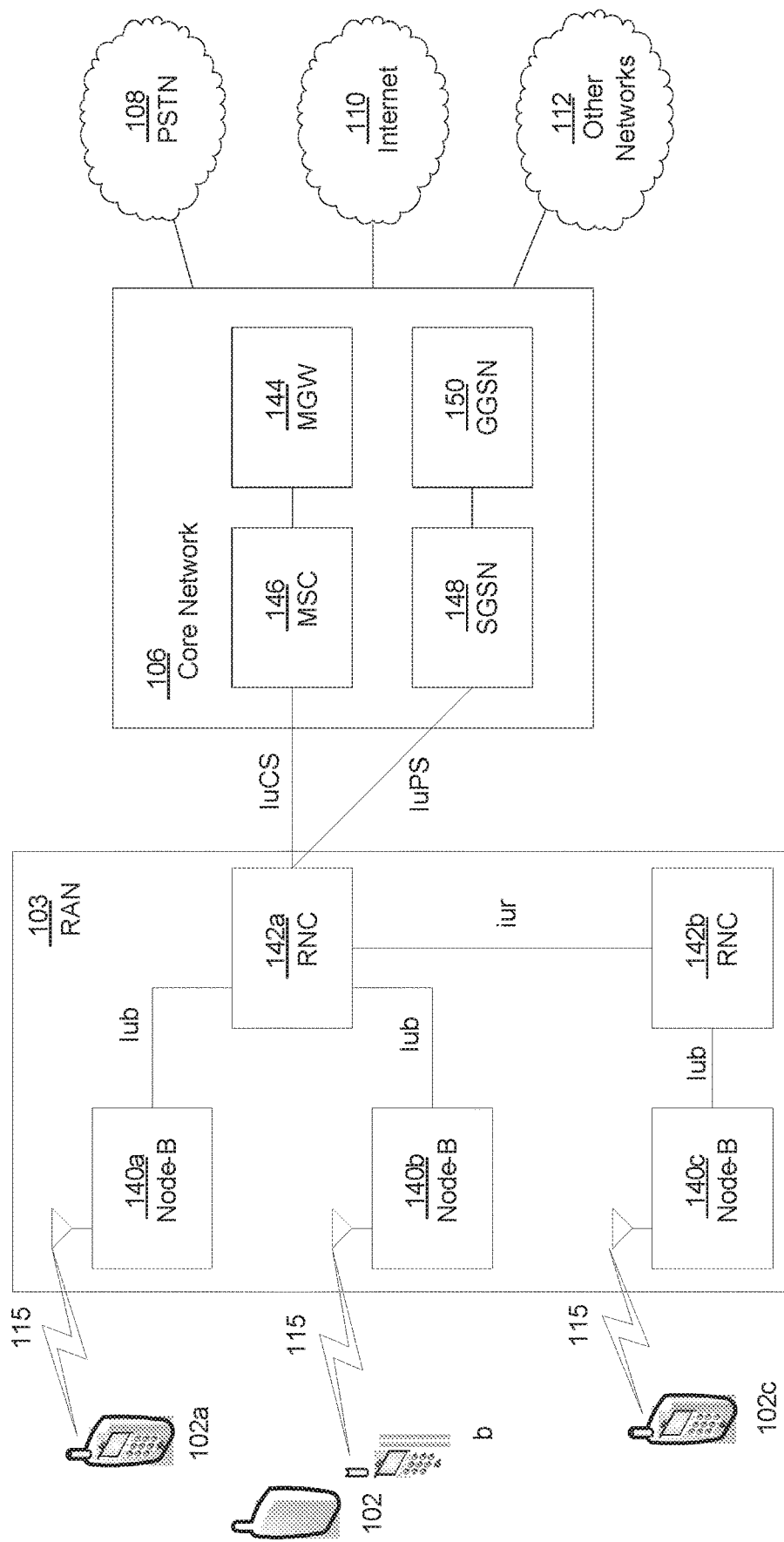
FIG. 1C illustrates a system diagram of a radio access network and a core network according to an embodiment of the application.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
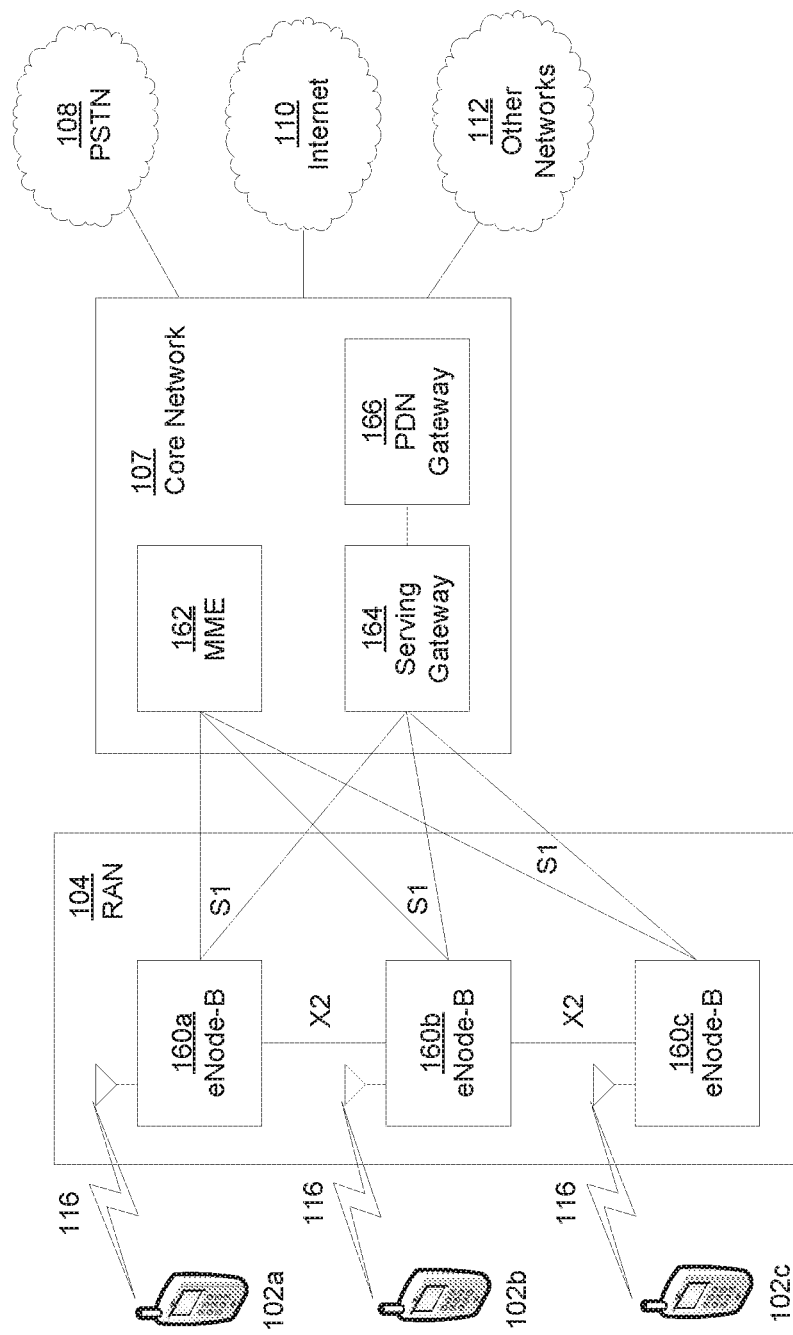
FIG. 1D illustrates a system diagram of a radio access network and a core network according to another embodiment of the application.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
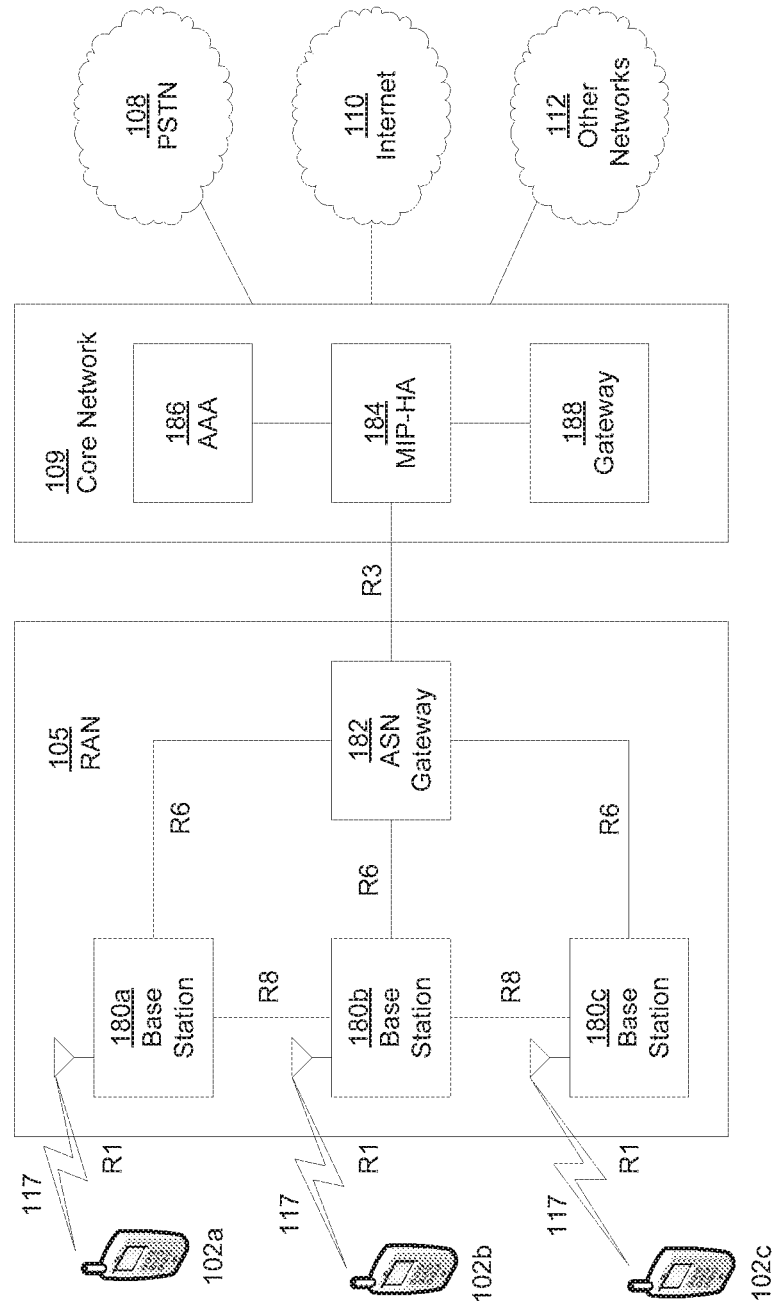
FIG. 1E illustrates a system diagram of a radio access network and a core network according to yet another embodiment of the application.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
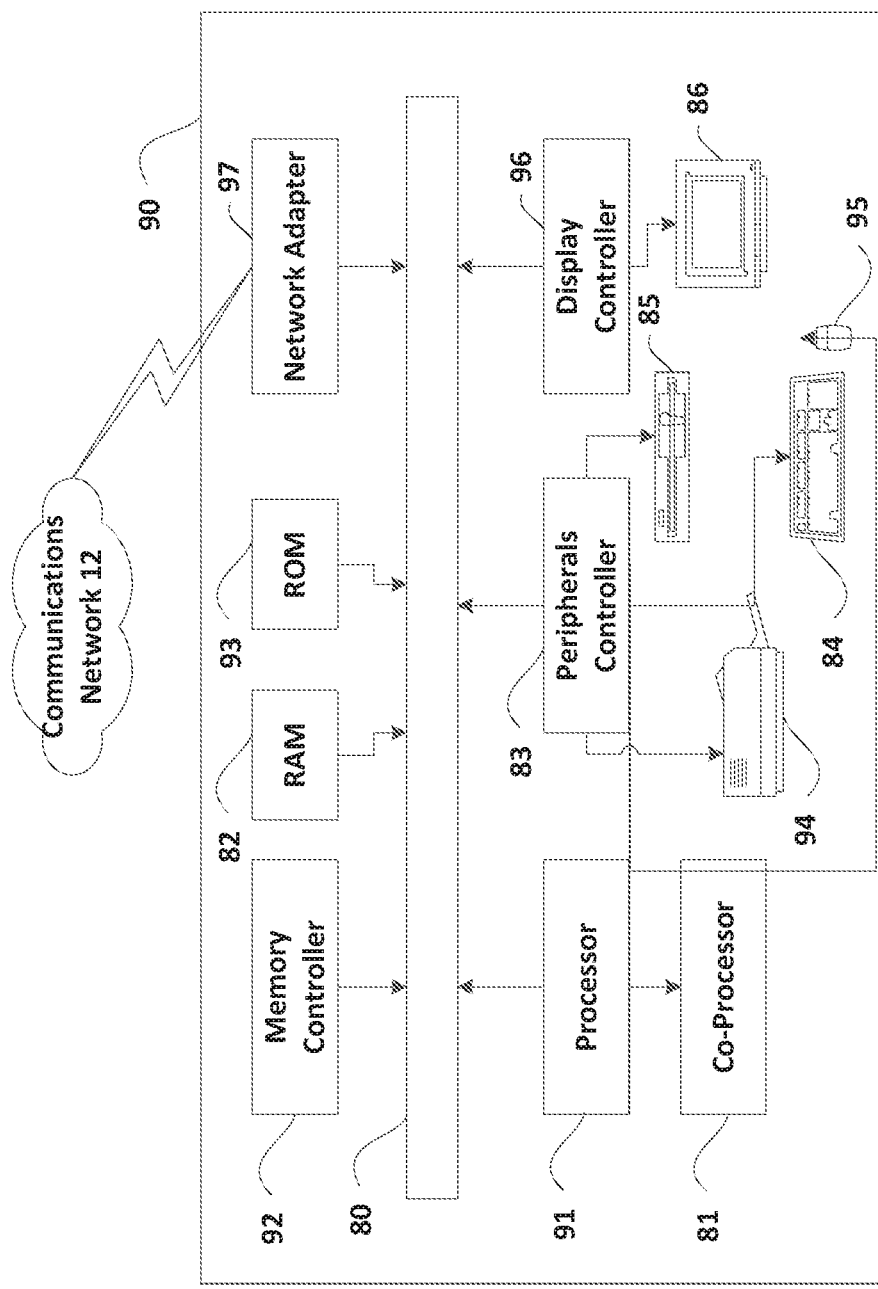
FIG. 1F illustrates a block diagram of an exemplary computing system in communication with one or more networks previously shown in FIGS. 1A, 1C, 1D and 1E according to an embodiment of the application.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). One example of the GUI is shown in FIG. 25. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

New Radio Requirements

According to an embodiment, 3GPP TR 38.913 defines scenarios and requirements for NR technologies. The Key Performance Indicators (KPIs) for eMBB, URLLC and mMTC devices are summarized in Table 2.

TABLE 2

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |

TABLE 2-continued

| Device | KPI | Description | Requirement |
|---|---|---|---|
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes (1) within 1 ms, which is the time it takes to deliver a small data packet from the radio protocol layer 2/3 SDU ingress point to the radio protocol layer 2/3 SDU point of the radio interface, at a certain channel quality (e.g., coverage-edge).<br>NOTE1: Specific value for X is FFS. | 1-10-5 within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of dB, assuming a stored energy capacity of [5 Wh]. | 15 years |
| | Connection Density | Connection density refers to total number of devices fulfilling specific Quality of Service (QoS) per unit area (per km2). QoS definition should take into account the amount of data or access request generated within a time t_gen that can be sent or received within a given time, t_sendrx, with x % probability. | 106 devices/km2 |

NR Beamformed Access

Currently, 3GPP standardization's efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to unfavorable scattering environment due to blockage caused by poor diffraction. Therefore, MIMO/beamforming is essential in guaranteeing sufficient signal level at the receiver end.

Relying solely on MIMO digital precoding used by digital BF to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with many antenna elements. This is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

Figure 2:
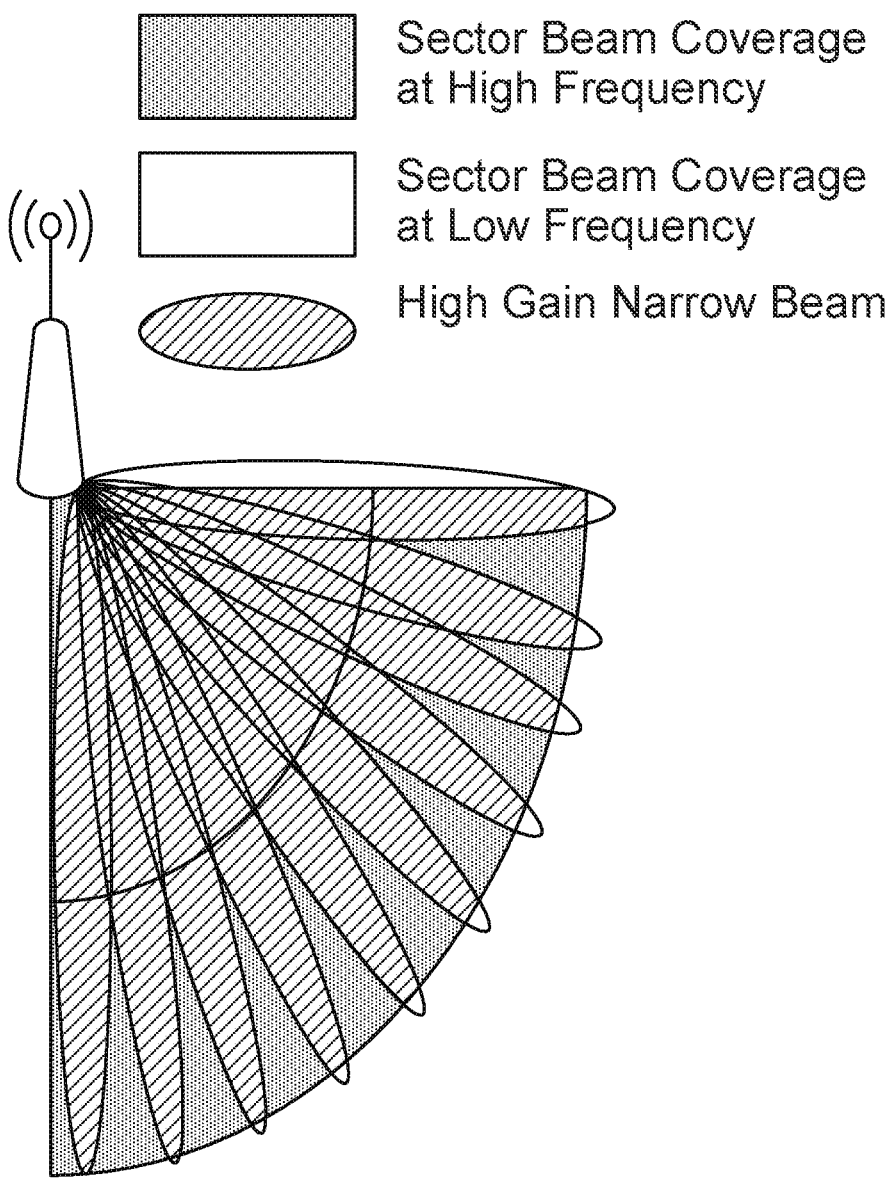
FIG. 2 illustrates cell coverage with sector beams and multiple, high-gain narrow beams.
Figure 3:
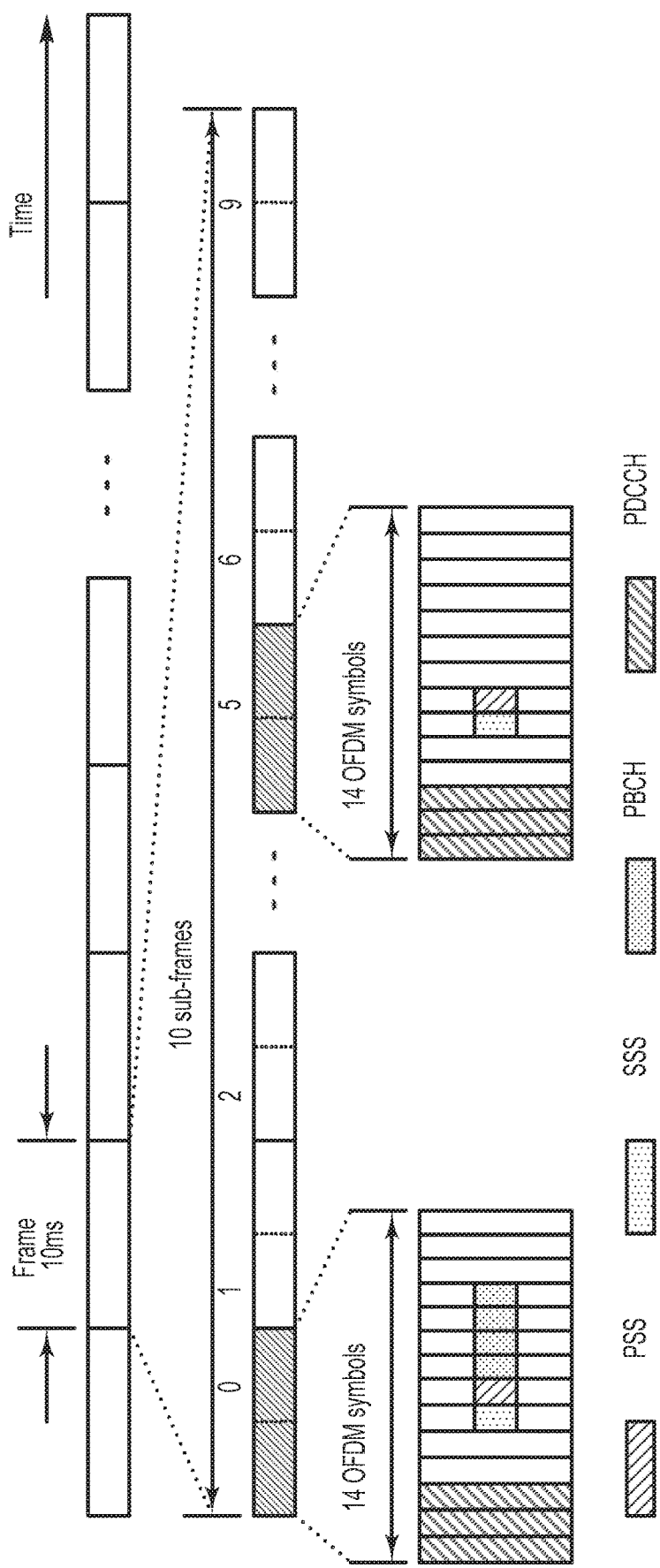
FIG. 3 illustrates a LTE frame structure with a primary synchronous sequence (PSS), a secondary synchronous sequence (SSS), and physical broadcast channel (PBCH) allocations.
Figure 4:
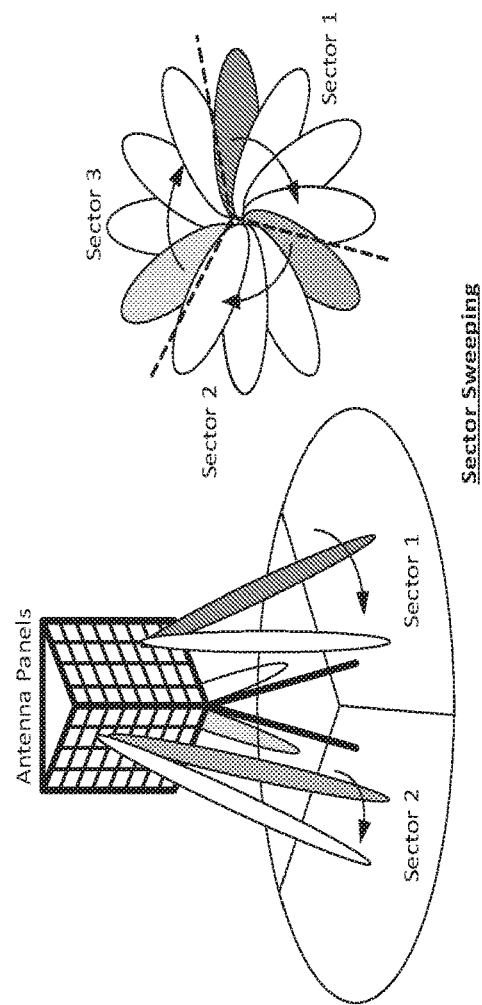
FIG. 4 illustrates an example of cell and sector sweeping.
Figure 4:
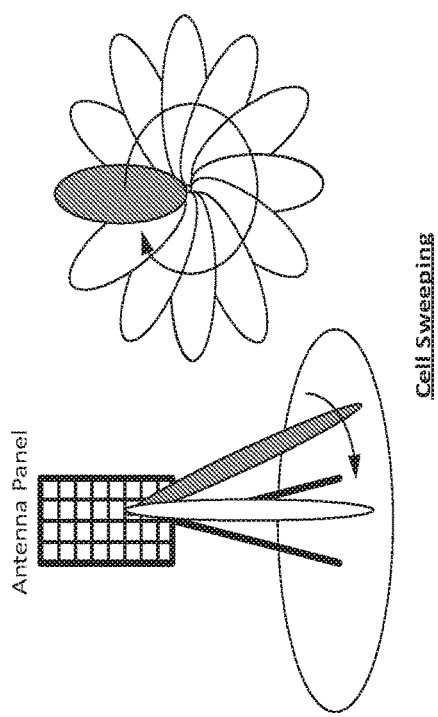

From these observations above, multiple transmissions in time domain with narrow coverage beams steered to cover different serving areas are necessary. Inherently, the analog beam of a subarray can be steered toward a single direction at the time resolution of an OFDM symbol or at any appropriate time interval unit defined for beam steering across different serving areas within the cell. The number of subarrays determines the number of beam directions and the corresponding coverage on each OFDM symbol or time interval unit defined for the purpose of beams steering. The provision of multiple narrow coverage beams has been called "beam sweeping." This concept is illustrated in FIG. 2 where the coverage of a sector level cell is achieved with sectors beams and multiple high gain narrow beams. Also, for analog and hybrid beamforming with massive MIMO, multiple transmissions in the time domain with narrow coverage beams steered to cover different serving areas is essential to cover the whole coverage areas within a serving cell in NR.

One concept closely related to beam sweeping is beam pairing. Beam pairing is used to select the best beam pair between a UE and its serving cell. The best beam pair can be used for control signaling or data transmission. For the downlink transmission, a beam pair will consist of UE RX beam and gNB TX beam. And, for uplink transmission, a beam pair will consist of UE TX beam and gNB RX beam.

Another related concept is beam training. Beam training is used for beam refinement. For example, a coarser sector beamforming may be applied during the beam sweeping and sector beam pairing procedure as illustrated in FIG. 2. Beam training may then follow where the antenna weights vector are refined. And, this can be followed by the pairing of high gain narrow beams between the UE and gNB.

DL Synchronization in LTE/LTE-A

In one aspect, in current 3GPP LTE/LTE-A systems, two specially designed physical signals are broadcasted in each cell. These signals include the Primary Synchronization Signal (PSS) and the Secondary Synchronization Signal (SSS). The detection of these two signals not only enables time and frequency synchronization, but also provides the UE with the physical layer identity of the cell and the cyclic prefix length. In the case of initial synchronization, in addition to the detection of synchronization signals, the UE proceeds to decode the Physical Broadcast Channel (PBCH) including critical system information such as system bandwidth, PHICH information and SFN.

Initial Access Burst

Figure 5A:
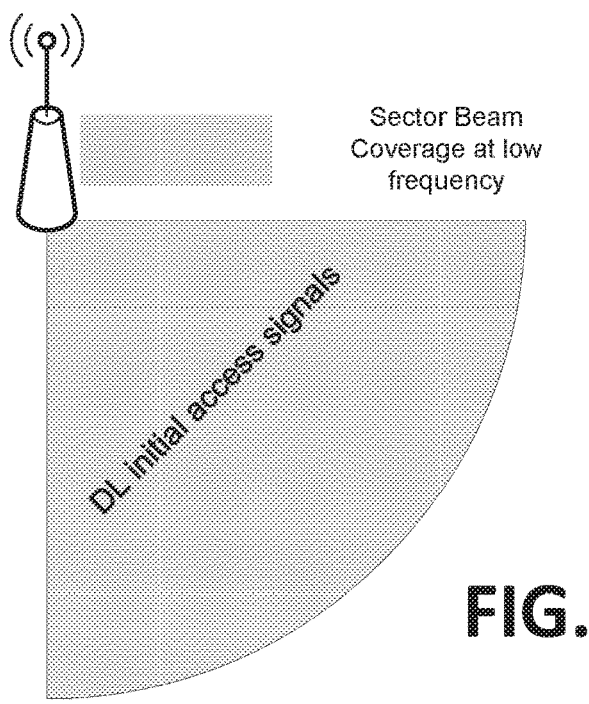
FIGS. 5A and 5B respectively illustrate NR systems supporting single and multi-beam systems.
Figure 5B:
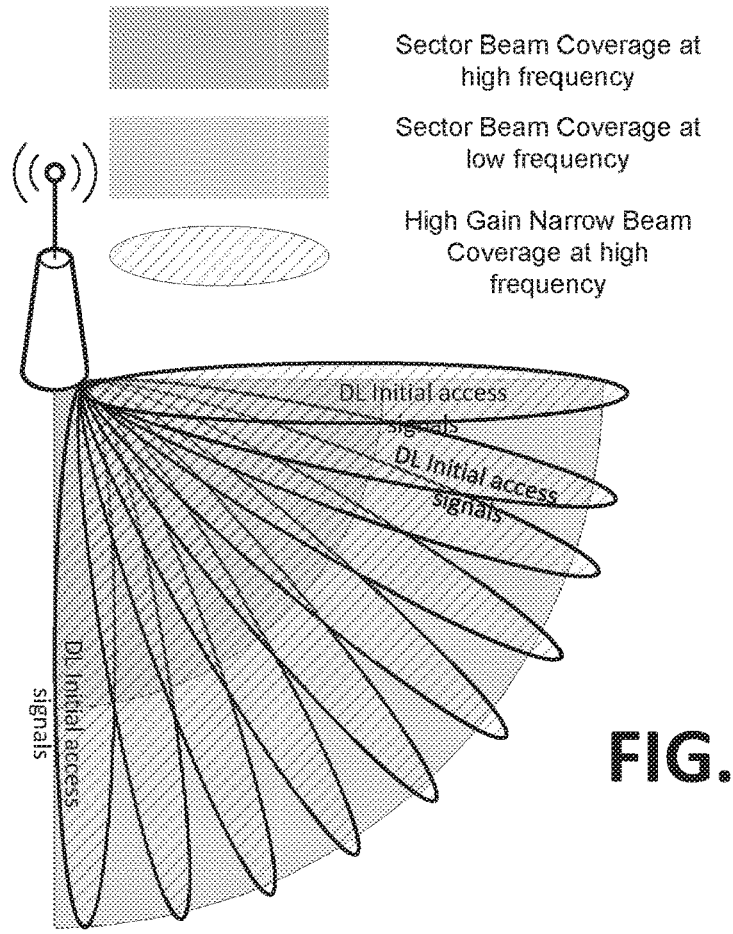

In an aspect of the disclosure, NR systems supporting both single beam (or single sector) and a multi-beam (multi-sectors) approach for initial access signal transmission is described. This is illustrated in FIGS. 5A and 5B. The initial access signal includes DL synchronization channels, i.e., PSS/SSS and PBCH channel. A SS beam sweeping block is defined as a beam sweeping time unit for broadcasting PSS/SSS and PBCH. Each sweeping block may include one or more CP-OFDM symbols. Multiple blocks can form a beam sweeping burst. Here, the length of a SS sweeping burst refers to the number of beam sweeping blocks in a burst. For example, if a beam sweeping burst length is equal to M, then there are M sweeping blocks in a burst.

The DL beam-sweeping burst may periodically transmit at a period. This periodic T may be varied with different applications including URLLC, mMTC or eMBB services. T may also be varied with different frequency bands (or frequency ranges), numerology, and traffic/mobility profile of UE. The SS burst design can be varied with FDD, TDD, flexible subframe and numerology. If DL and UL transmissions occur at different frequency bands, i.e., FDD, the SS burst design can be across contiguous subframes without reserving UL transmissions. Hence, it can accommodate more SS blocks in a subframe than TDD. However, DL symbols in a slot or subframe may be reserved for gcPDCCH or UE-specific PDCCH transmissions. Therefore, non-contiguous SS bursts between continuous subframes can be supported in FDD.

On the other hand, for TDD, UL subframe transmissions may be reserved in a radio frame. The SS burst design has to support non-contiguous SS bursts between continuous subframes as well. The SS burst design in TDD also supports a various number of DL-UL subframes in a radio frames. For flexible subframe structures, it supports DL and UL transmission symbols in a subframe. Hence, SS burst designs can support a non-contiguous SS burst block.

UE Initial Access Operations

In yet another aspect of the disclosure, after the UE successfully acquires the timing and frequency information from the PSS and SSS, and obtains the MIB/SIB in PBCH, the UE will start to perform Tx beam sweeping and DL Tx beam feedback. The uplink channels used by the UE for Tx beam sweeping and DL Tx beam feedback should be implicitly signaled/mapped from the acquired PSS/SSS (beam ID) and/or PBCH direct signaling.

There are several techniques envisaged in this application for implicit or explicit signaling/mapping of UL channels to perform Tx beam sweeping and DL Tx beam feedback.

NR-PRACH is one example of such a UL channel. Here, the PRACH illustrates the mapping/signaling. The PRACH resources used for Tx sweeping at an initial access stage may be fixed per frequency band or semi-statically configured by the gNB. For the latter case, PRACH resource information needs to be signaled in MIB or essential SIB (such as SIB1, SIB2 in LTE). In NR systems, MIB can be transmitted on PBCH and essential SIB can be transmitted on the secondary PBCH (denoted as SPBCH).

In one embodiment of this aspect, one set of PRACH resources (in terms of time and frequency) is exclusively configured/mapped for each SS block (corresponding to one beam swept in the DL for initial access). All preambles configured in a PRACH signaled MIB/essential SIB (transmitted by PBCH or SPBCH) can be used for UEs that successfully acquire this beam in PSS/SSS.

Figure 6:
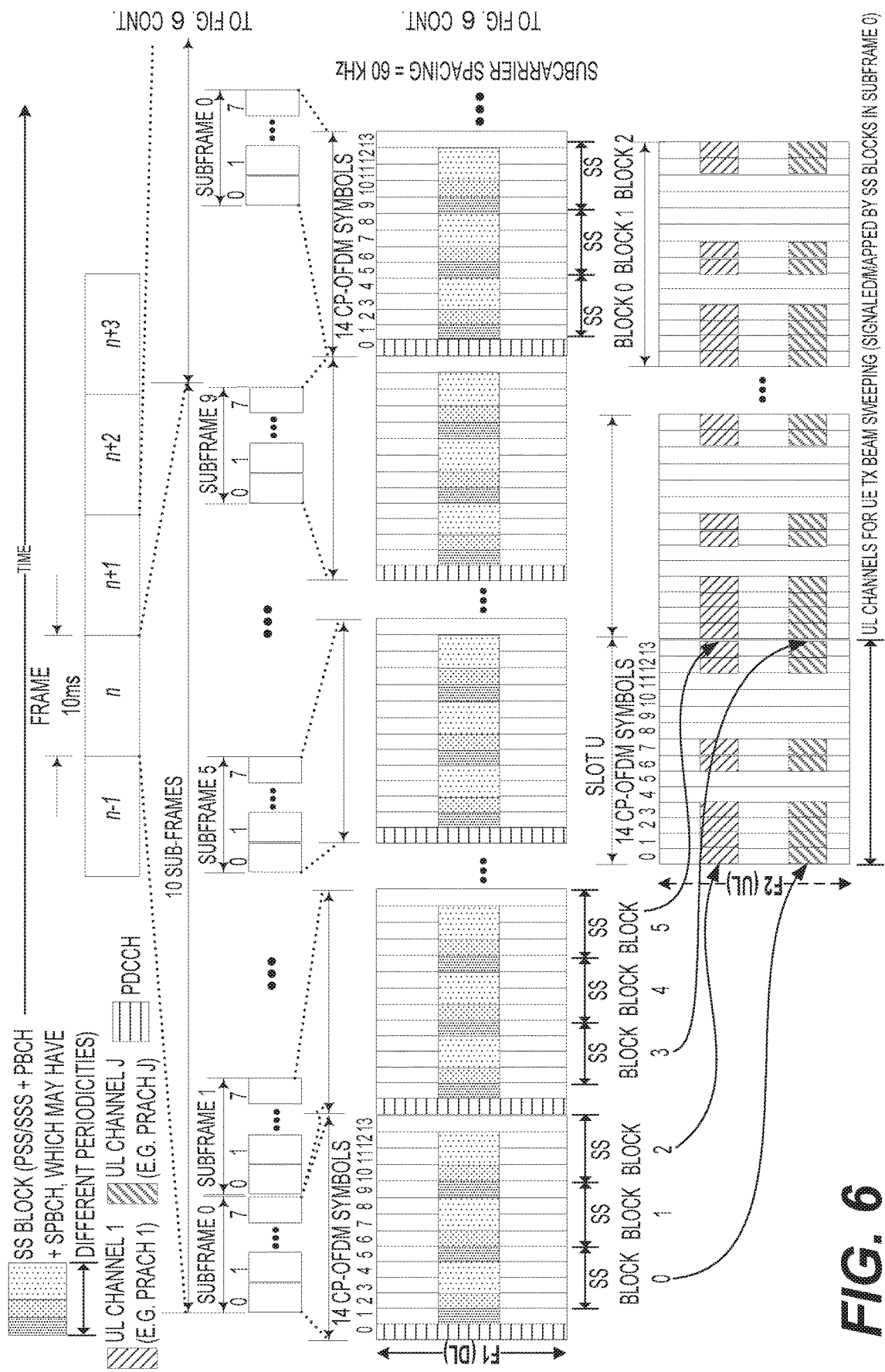
FIG. 6 illustrates a user equipment uplink (UL) channel to perform beam sweeping and downlink (DL) transmission beam feedback linked to acquire a SS block in the FDD frame structure.
Figure 6:
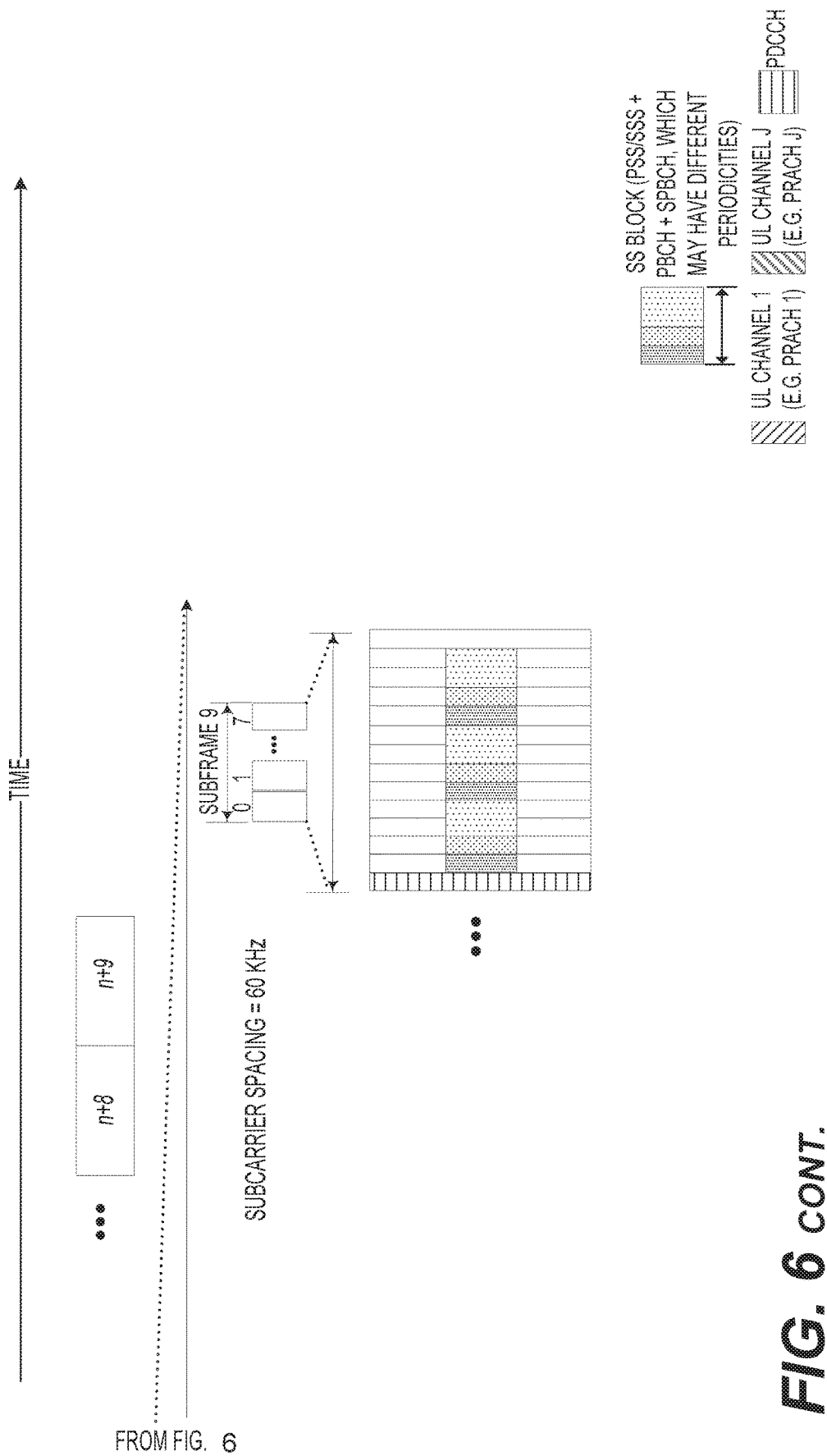

In another embodiment of this aspect, one set of PRACH resources (in terms of time and frequency) is exclusively configured/mapped for a group of SS blocks (corresponding to several beams swept in the DL for initial access). For example, the group can be a SS block transmitted in the same sub-frame. Any UE that successfully acquires a beam swept in this group of SS blocks can transmit on this set of PRACH resources. A subset of PRACH preambles are mapped for each SS block (corresponding to one beam swept in the DL). A UE that successfully acquires a beam in the SS block can transmit PRACH using one of the preambles in the subset mapped to the SS block. Subsets of preambles for different SS blocks are non-overlapping. This will help the gNB detect the index of the DL Tx beam that was acquired by a particular UE. An example of UE uplink channels performing beam sweeping and DL Tx beam feedback to acquire the SS block in a FDD frame structure is illustrated in FIG. 6.

The following UE procedures are performed for beamforming based initial access. In the PSS detection stage, the UE performs the following steps: (i) Cross-correlate received signal with the Q possible PSS sequences, where Q is the maximum number of PSS sequences that can be supported; (ii) Store the cross-correlate result into various accumulation buffers according to the various PSS broadcast periodicity, respectively; and (iii) Choose the strongest peak from the accumulation buffers; and (iv) obtain the corresponding partial cell ID (say, $N_{ID}^{(1)}$) with its corresponding root sequence u.

The time relative position of the correlation peak gives the time offset to the waveform symbol to begin SSS detection. In SSS detection stage, the UE performs the following steps: (i) Cross-correlate received signal with the P possible SSS sequences; (ii) Store the cross-correlate result into various accumulation buffers according to the various SSS broadcast periodic, respectively; (iii) Choose the strongest peak and obtain the corresponding partial cell ID (say, $N_{ID}^{(1)}$; and (iv) Calculate cell ID $N_{ID}^{cell}$ using $N_{ID}^{(1)}$ and $N_{ID}^{(2)}$.

In the SS (PSS/SSS) detection stage, the UE may obtain the beam ID either from the SS or from beam reference signals (BRS). The UE can understand which DL beam sweeping block is detected. The US is also able to calculate the timing offset from the detected beam sweeping block and the DL sweeping subframe. Ultimately, the UE can determine whether the beam (identified by the beam ID) is gNB's best DL Tx beam for the UE.

According to yet another embodiment, after the UE successfully detects SS (PSS/SSS) and acquires timing and frequency, it will obtain the timing information of the next PBCH. The evaluated information includes and is not limited to: (a) Timing of acquired SS (PSS/SSS) symbols (within the sub-frame); (b) Fixed timing of between SS (PSS/SSS) symbols and PBCH symbols; and (c) Periodicity of SS burst, periodicity of SS (PSS/SSS) symbols and periodicity of PBCH.

Depending on the relative periodicities of SS (PSS/SSS) symbols and PBCH, the UE may need to perform blind detection to decode PBCH. The PBCH contains the MIB information elements such as DL Bandwidth and SFN (partial bits). The PBCH may also carry other information such as scheduling of SPBCH or information of UL channels (for example, PRACH) that can be used by the UE to perform its UL Tx beam sweeping and feedback of DL Tx beam acquired in SS.

According to another embodiment, after detection of PBCH, the UE may detect the SPBCH by obtaining the timing of the next PBCH according to the following information: (a) Timing of acquired SS (PSS/SSS) symbols (within the sub-frame); and (b) Fixed timing between SS (PSS/SSS) symbols, PBCH symbols and SPBCH symbols; (c) Periodicity of SS burst, periodicity of SS (PSS/SSS) symbols, periodicity of PBCH, and periodicity of SPBCH. Depending on the relative periodicities of SS (PSS/SSS) symbols, PBCH and SPBCH and the timing resolution of SFN carried in PBCH, the UE may perform blind detection to decode SPBCH. The SPBCH includes essential SIB information for the UE to further access the networks. Such information may include and is not limited to information of UL channels (for example, PRACH) that can be used by the UE to perform its UL Tx beam sweeping and feedback of DL Tx beam acquired in SS.

Beam Link Pairing at Initial Access

According to another aspect of the disclosure, PRACH is employed to illustrate the proposed solutions assuming gNB and UE's UL and DL beamforming are reciprocal. After the UE has successfully acquired SS, PBCH and SPBCH, it can obtain the following information based on implicit signaling/mapping of SS (PSS/SS), beam ID, and scheduling and PRACH information from PBCH and/or SPBCH: (i) The set of PRACH resources (in terms of time and frequency) for it to use in Tx beam sweeping and feedback of DL Tx beam; and (ii) The set of PRACH preambles for it to use (determined/mapped by the beam ID it acquired).

Figure 7:
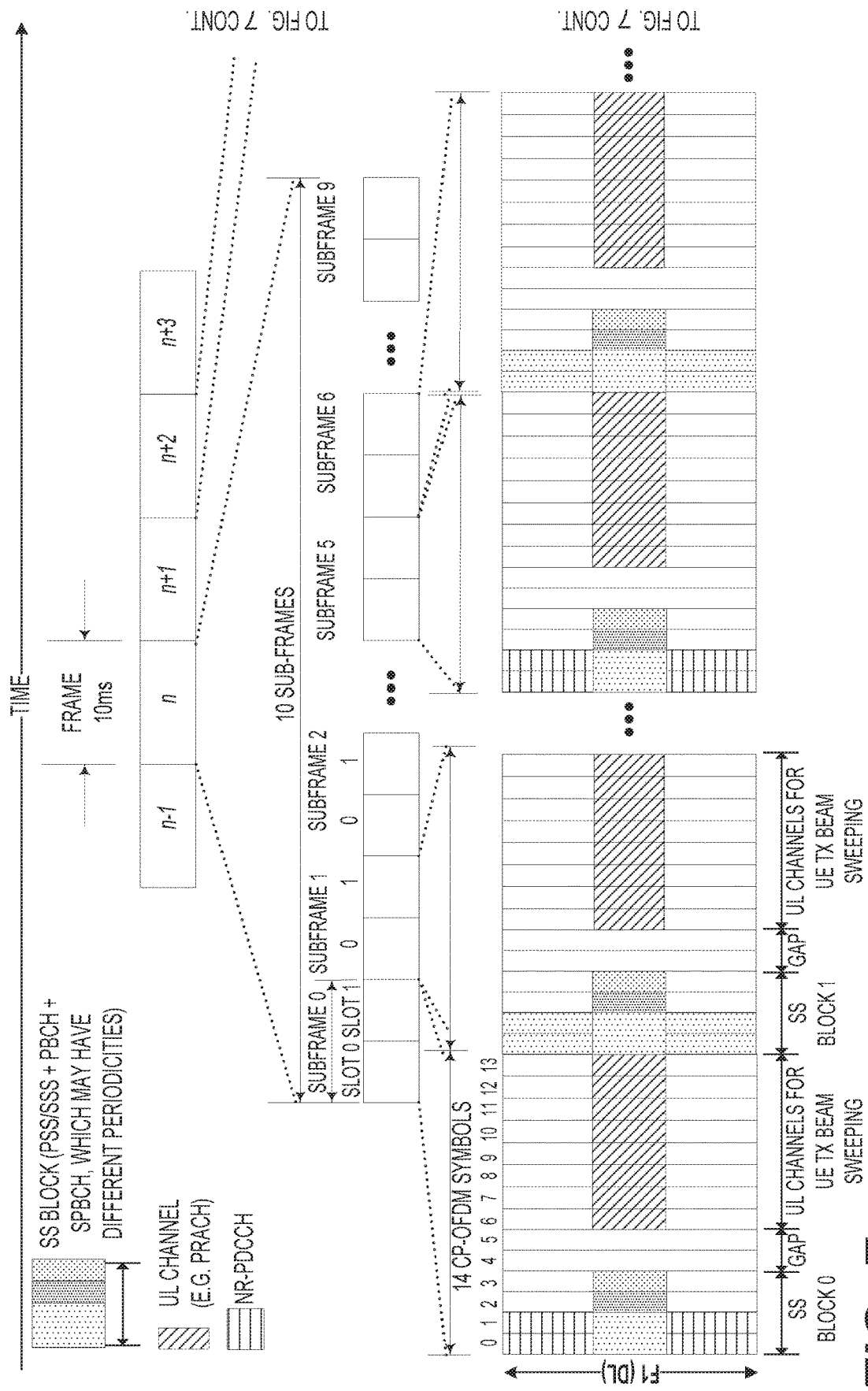
FIG. 7 illustrates a user equipment UL channel to perform beam sweeping and DL transmission beam feedback linked to the acquired SS block in a flexible frame structure.
Figure 7:
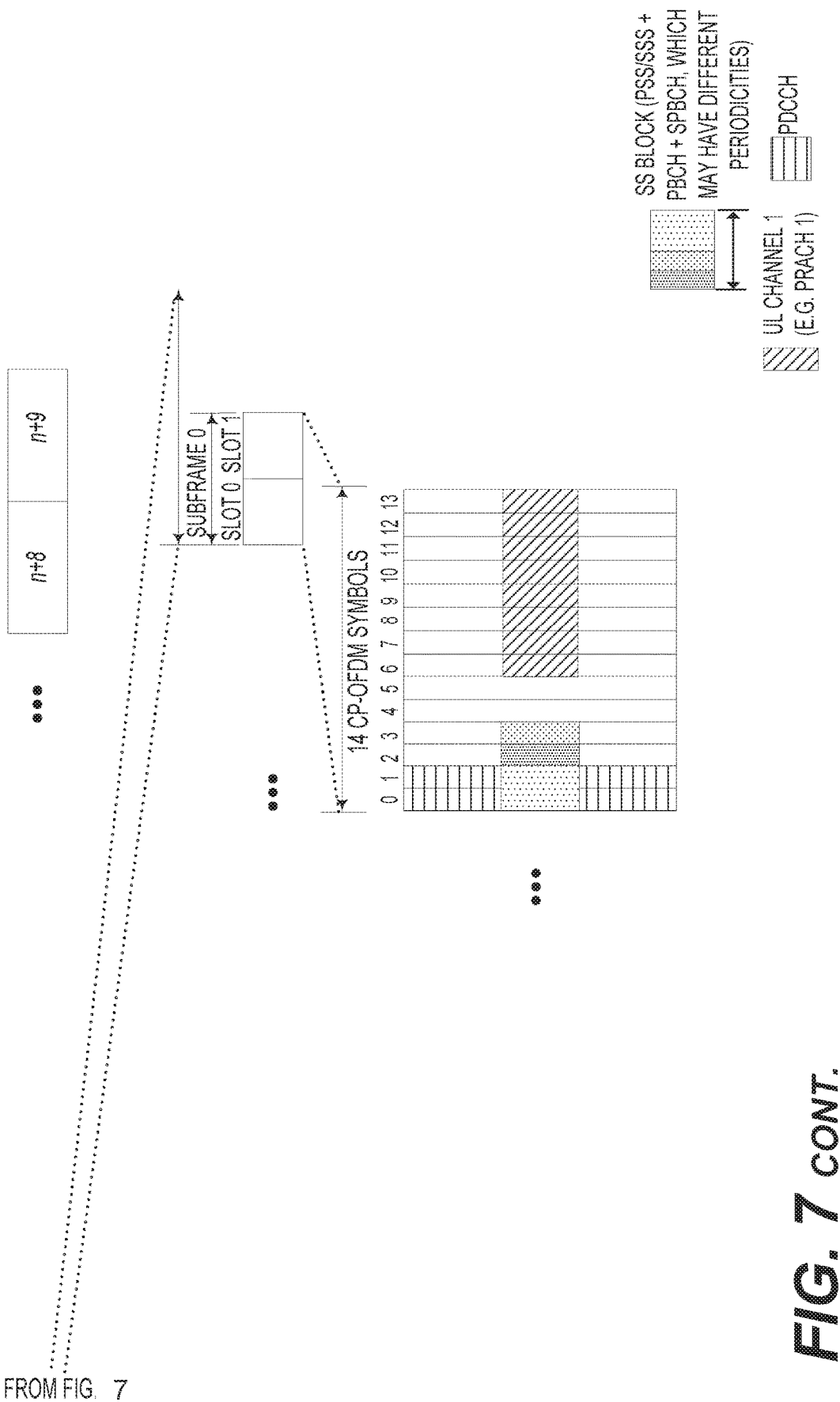

FIG. 7 provides an exemplary illustration of a UE uplink channel to perform beam sweeping and DL Tx beam feedback linked to acquire a SS block in a flexible frame structure. In one embodiment, the following procedures are performed for beam link pairing at initial access. In Step 1 of this embodiment, the UE performs its Tx beam sweeping and feedback of DL Tx beam using PRACH preambles on the determined PRACH resources according to PRACH resources and preamble mapping rules. In this way, the feedback of the DL Tx beam for this UE is implicitly signaled by its PRACH transmission.

There are two methods to signal the beam ID of UE's UL Tx beam. One method is explicit signaling and the other is implicit signaling. These will be discussed below in more detail. But first, the UE will transmit a series of PRACH preambles sweeping through a set of potential UL Tx beams (or all Tx beams). Such a series of PRACH transmission instances (symbol, mini-slot, slot or subframe) sweeping through a set of potential UL Tx beams is called one UL Tx Sweeping (TS) burst.

In explicit signaling, the PRACH used for UL Tx beam sweeping at the initial access stage consists of two parts—the preamble part and the subsequent message part. The UL Tx beam ID is explicitly signaled on the message part. Here the RA-RNTI can have the same formula as in LTE but with extended parameter ranges. RA-RNTI=RA-RNTI=1+t_id+ 10*f_id, where t_id is the index of the $1^{st}$ PRACH transmission instance (i.e., a symbol, a slot, a mini-slot or subframe) of the specified PRACH resources set (0≤t_id <max_PRACH_resources_time_index). f_id is the index of the specified PRACH within that PRACH transmission instance, in ascending order of frequency domain (0≤f_id<max_PRACH_resources_frequency_index).

Separately, implicit signaling can be achieved by UE maintaining a record of preamble transmitted and beam used on each PRACH transmission during its UL Tx beam sweeping. That is, the UE records the database {Preamble Index, UL Beam ID, t_id, f_id} of each beam sweeping using PRACH. The method also needs to re-define the RA-RNTI as a function of t_id, f_id and beam ID, where t_id is the index of the first PRACH transmission instance (could be a symbol, a slot, a mini-slot or subframe) of the specified PRACH resources set (0≤t_id <max_PRACH_resources_ time_index). f_id is the index of the specified PRACH within that PRACH transmission instance, in ascending order of frequency domain (0≤f_id<max_PRACH_resources_frequency_index).

The gNB may detect several RACH preambles transmitted by the UE at different PRACH transmission instances within a TS burst. Unlike other RACH procedures where a Random Access Response (RAR) is generated for each detected RACH preamble, in UE initial access Tx beam sweeping, the gNB will pick the best preamble (and corresponding beam) within the TS burst and generate only one RAR for it. The criteria of picking the best preamble (and corresponding beam) includes and not limited to selecting the peak received power and SINR.

In Step 2 of this embodiment, the UE monitors the DL on the same DL Tx beam that it acquired during SS (PSS/SSS) detection for (RARs). In other words, during the RAR window, the UE monitors the NR-PDCCH for RARs identified with RA-RNTIs corresponding to UE's PRACH transmission. The length of the RAR window will be selected to be long enough to cover the TS burst plus some margin.

The RAR includes an UL grant. The RAR may also include the UE's UL Tx Beam ID feedback. If explicit signaling of the beam ID (method 1) is used in Step 1 of RACH procedures, then RAR will carry UE's UL Tx Beam ID feedback explicitly. If UE's preamble transmission does not explicitly carry its UL Tx beam ID (used in UL Tx beam sweeping), then gNB will use the re-defined RA-RNTI. Either way, the beam link pair (BPL) between the UE and gNB at the initial access is established at this step.

In Step 3 of this embodiment, upon receiving a valid RAR with matched RA-RNTI, the UE will transmit the Msg3 (carrying a RRCConnectionRequest or similar message) according to the UL grant received in the RAR. The BPL determined in Step 2 should be used for beamforming transmission in Step 3. Last, in Step 4, the gNB may perform contention resolution if multiple UEs transmit the same Msg3 in step 3. The BPL determined in Step 2 should be used for beamforming transmission in Step 4 as well.

Beam Training and Mobility Management

According to yet even a further aspect of the disclosure, once the RRC Connection is established for a UE, the UE is able to have the following configurations of channel and RS resources:

(i) Resource allocation configuration for UL control (PUCCH) transmission;

(ii) Resource allocation, ports, sequence configuration and transmission period for (group) CSI-RS (or beam RS);

(iii) Resource allocation, ports and DMRS configuration for group common PDCCH;

(iv) Resource allocation, ports and DMRS configuration for UE-specific PDCCH; and (v) Resource allocation, ports and DMRS configuration for UE-specific PDSCH.

In order to maintain good BPL quality between the UE and gNB, the network can allocate and configure multiple sets of CSI-RS for the UE to perform (periodic or aperiodic) a beam link pairing maintenance operation. This may include a CSI-RS configuration for a UE (i.e., UE-specific) or for a group of UEs (i.e., group-common). Further, the network will configure NR-PUCCHs for the UE or the group of UEs to transmit their beam report feedback.

The UE will measure the configured CSI-RS and transmit the beam report feedback to the gNB according the feedback configuration (aperiodic, periodic or event-triggered). For an event-triggered beam report feedback, one criteria is that the UE measure the current BPL quality. This is at least based upon the DM-RS in its received NR-PDCCH, NR-PDSCH. If it is below a predefined threshold, it will report the monitored beam report/quality to the gNB. The beam report format can be the best beam or Q best beams. The feedback information can include beam ID and quantized RSRP or SINR (optional).

Once the gNB receive the feedback of beam IDs from UE, the gNB will compare the beam report with a current DL Tx beam used for the UE and decide whether to switch beams for DL. If the gNB decides to switch a DL Tx beam, it will transmit a special NR-PDCCH which contains an UL grant and allocates UL channels for the UE to perform UL Tx beam sweeping and a "beam switching command/indicator." The UE will start UL Tx beam sweeping on the allocated UL channels. After the gNB selects the UE's best UL Tx beam and feedbacks it to the UE, a new BPL is determined and will be used in subsequent control and data transmissions between the UE and the gNB. The configured (group) CSI-RS can be used for group common PDCCH DMRS to save RS overhead.

Beam Quality Indication Report and Connected Mode DRX

Figure 8:
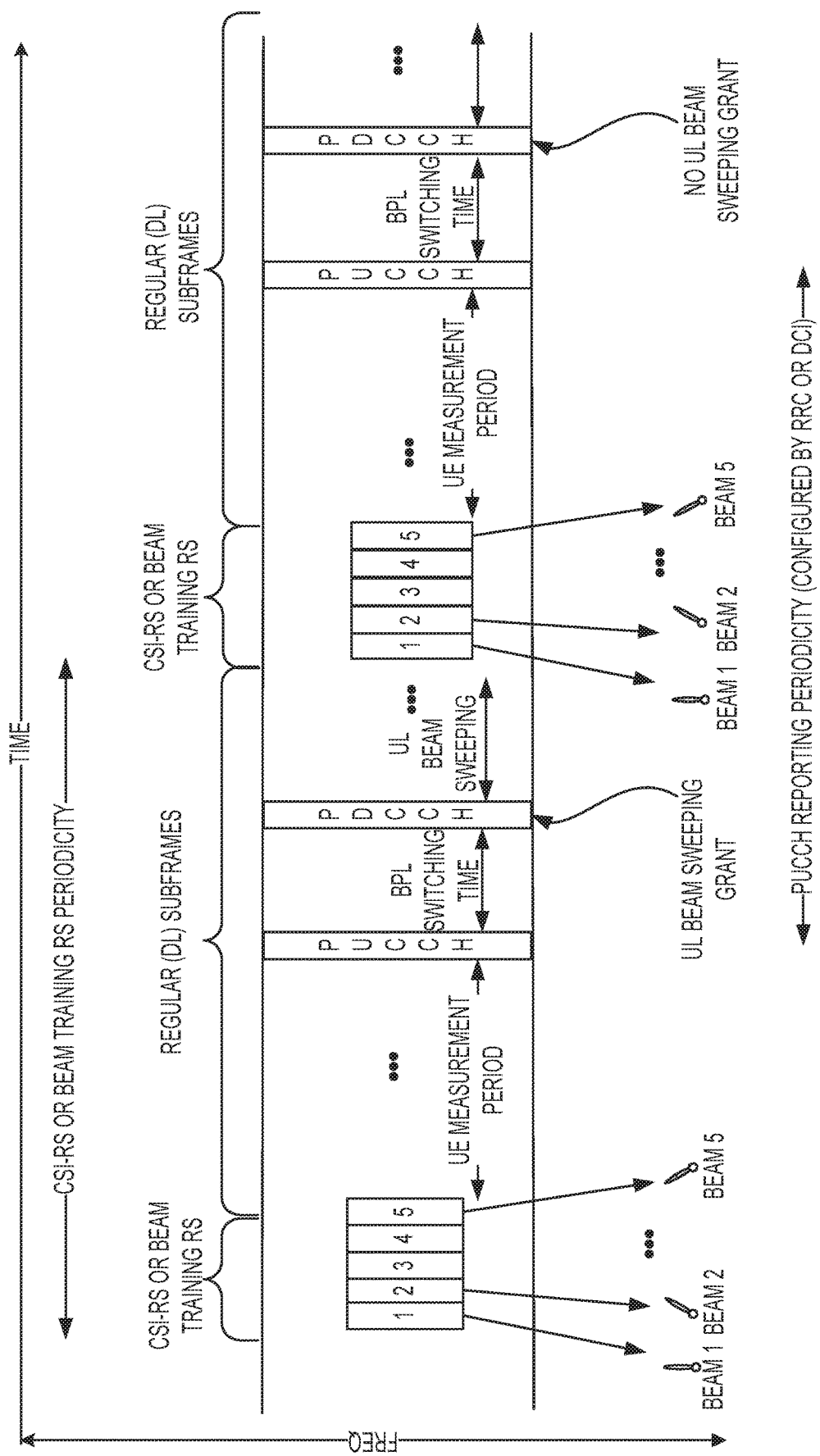
FIG. 8 illustrates a configured CSI-RS that can be used for BPL.

In even a further aspect of the disclosure, such as for example in FIG. 8, the UE feedback reporting cycle can operate with the connected-mode DRX cycle. The BQI (Beam Quality Indicator) mask protocol information element (IE) is introduced. This IE BQI-mask limits beam quality reports to the 'on' duration period of the DRX cycle. If the IE BQI-mask is not setup by RRC, the BQIs and beam IDs (BID) on NR-PUCCH are not reported when inactive. Otherwise the UE sends BQIs and BIDs on PUCCH only if onDurationTimer is running.

In one embodiment, the UE can perform beam measurement based on configured CSI-RS while onDurationTimer is running and send feedback via NR-PUCCH to gNB. Once the gNB receives the feedback of beam IDs from the UE, the gNB will compare the beam report with the current DL Tx beam used for the UE and decide whether to switch DL beam. If the gNB decides to switch DL Tx beam, it will transmit a special NR-PDCCH to indicate "beam switching command/indicator" and whether it needs to perform UL Tx beam sweeping.

After beam switching, if the UE is able to successfully decode the NR-PDCCH and/or NR-PDSCH, the UE can assume a new BPL has been established. Otherwise, if UE is able to decode NR-PDCCH but fails to decode NR-PDSCH, the UE might need to feedback A/N with BQIs and BIDs to gNB in NR-PUCCH. If there are no reserved NR-PUCCH resources, the UE can use NR-PRACH for UE feedback. If UE is unable to decode PDCCH, the UE might be able to trigger the link-failure procedure for the beam recovery.

As expressly shown in FIG. 8, the gNB configures five training beams for a UE via CSI-RS or beam training RS. After a measurement period, the UE can feedback the beam IDs (i.e., beam ID 1 to 5) and beam quality indicator to gNB via NR-PUCCH. The reporting timing of the beam ID and beam quality can be regularized by a timer. Once the gNB receives the beam quality feedback from the UE, the gNB can send the beam switching command to indicate the UE is switching to a new beam for the next NR-PDSCH reception. The beam paring link (BPL) switching time can be defined to span from the time the NR-PUCCH carries the beam ID to the next NR-PDCCH carrying beam switching command.

Beam Pair Link Based UL Power Control

In NR, directional antenna gain with narrow beams contributes significantly to the signal path loss calculation. Currently in LTE, the UL path loss is estimated based on the received reference signal power on the DL as shown below as an example:

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} (dBm) \quad (1)$$

where $PL_C$ is the DL path loss estimate calculated in the UE for serving cell c in dB and $PL_C$=referenceSignalPower−higher layer filtered RSRP, which is applied to the power control to all the UL beams per serving cell.

Since the DL beam pair link gain may significantly differ from the measurements with different reference signals, and from the UL beam pair link gain due to directional narrow beam antenna gain differences, it become necessary to include the Beam Pair Link Gain Difference, $\Delta_{bpl}$, in the UL power control equation (1) above:

$\Delta_{bpl}$=DL beam pair gain−UL beam pair gain.

Therefore, the UL transmit power may be adjusted with the Beam Pair Link Gain Difference $\Delta_{bpl}$ for each beam in equation (2) below as an example:

$$P_{PUSCH,c}(i) = \min\left\{\begin{array}{l}P_{CMAX,c}(i), \\ 10\log_{10}(M_{PUSCH,c}(i)) + P_{O\_PUSCH,c}(j) + \alpha_c(j) \cdot PL_c + \Delta bpl + \Delta_{TF,c}(i) + f_c(i)\end{array}\right\} \quad (2)$$

Beam Pair Link Gain Difference $\Delta_{bpl}$ for each beam may be calculated based on UE's DL path loss measurement $L_{DLpath}$ with a specific DL reference signal, configured or selected during beam selection or beam pairing, and TRP or gNB's UL path loss measurement $L_{ULpath}$ or UL power adjustment $U_{Ladj}$ calculated by gNB in the following equations, $\Delta_{bpl} = L_{ULpath} - L_{DLpath}$, $\Delta_{bpl} = UL_{adj}$.

Beam Pair Link Gain Difference $\Delta_{bpl}$ for each beam may also be derived from gNB's Transmit Power Control (TPC) bit:

$\Delta_{bpl} = TPC \times \Delta_{adj}$,

Where "TPC=1" for increasing power and "−1" for decreasing power, "0" for no change, and $\Delta_{adj}$ is the power adjustment either preconfigured, indicated in SI, or signaled to UE via RRC, MAC CE or DL DCI.

Figure 9:
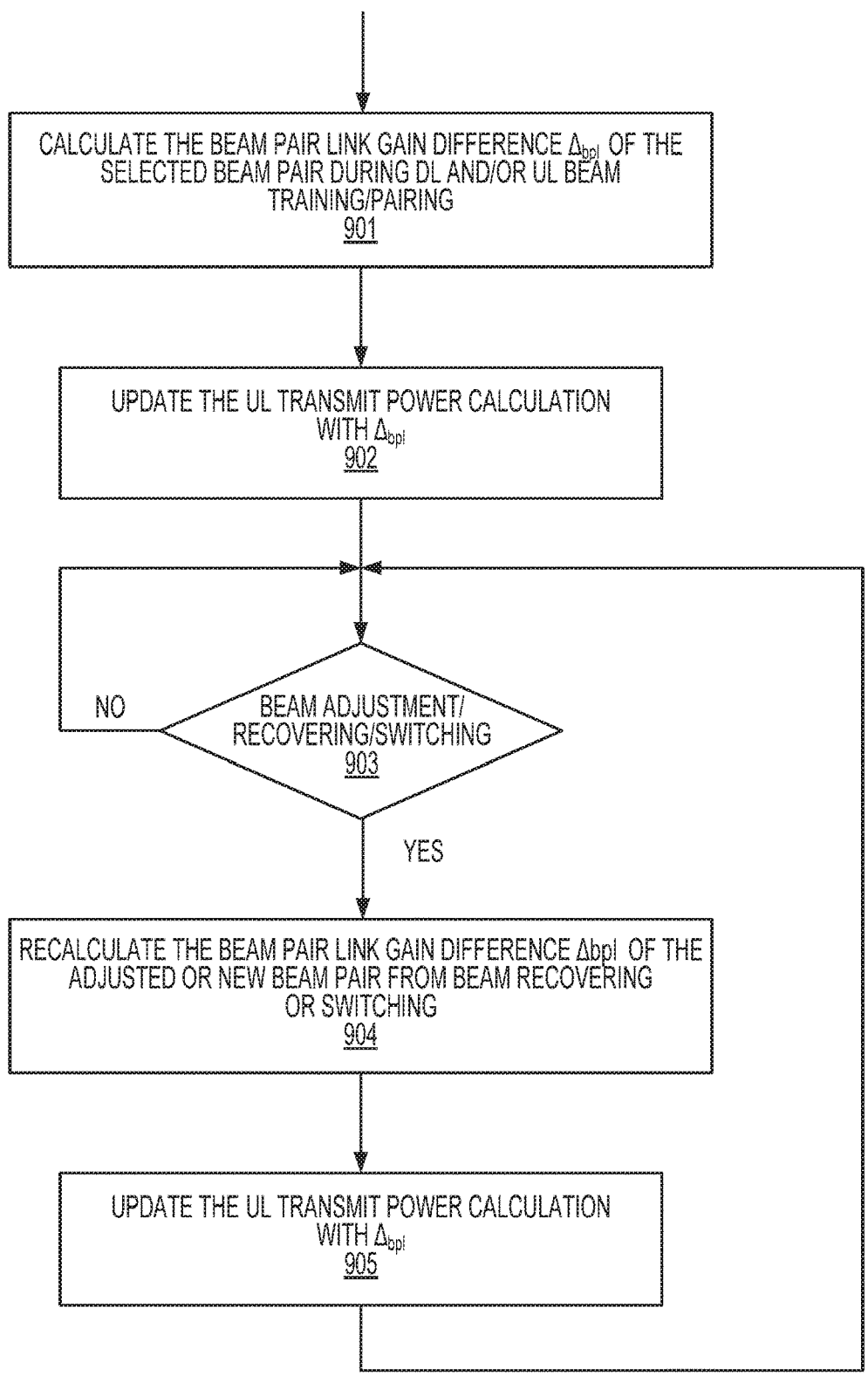
FIG. 9 illustrates an estimation of a beam pair link gain difference.

FIG. 9 exemplarily illustrates a decision tree for estimating the Beam Pair Link Gain Difference (BPLGD) $\Delta_{bpl}$. In step 901, a calculation of the Beam Pair Link Gain Difference $\Delta_{bpl}$ is based upon the selected beam pair during DL and/or UL beam training/pairing which is based on the measurements on the specific reference signal carried on the selected beam pair. In step 902, an update of the UL transmit power calculation with $\Delta_{bpl}$ is performed. In step 903, a query is made for beam adjustment/recovering/switching. If No, the decision tree proceeds to an instance between steps 902 and 903. If Yes, the decision tree proceeds to step 904. Step 904 recalculates the Beam Pair Link Gain Difference $\Delta_{bpl}$ of the adjusted or new beam pair from beam recovering or switching if there is no calibrated $\Delta_{bpl}$ available for the adjusted or new beam pair. Next in step 905, an update is made to the UL transmit power calculation for the adjusted or switched new beam pair with the $\Delta_{bpl}$ related to the adjusted or new beam pair calculated or stored.

Figure 10A:
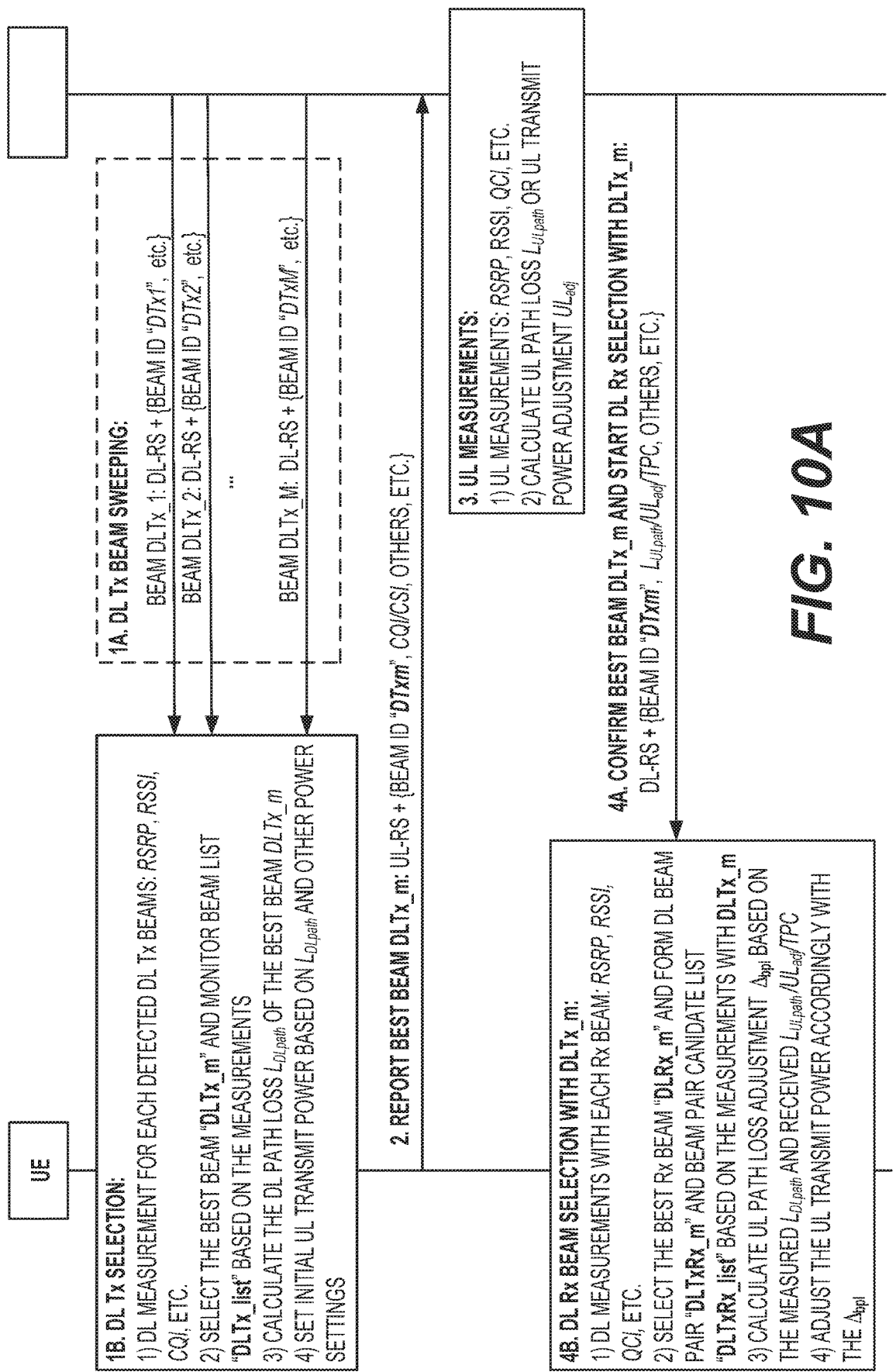
FIGS. 10A and 10B illustrate an estimation of a beam pair link gain difference during downlink beam training or pairing.

According to another embodiment, FIGS. 10A/B and 11A/B illustrate detailed examples of estimating the beam pair link gain difference $\Delta_{bpl}$. Specifically, FIGS. 10A-10B estimate beam pair link gain difference during downlink beam training or pairing.

As shown in FIG. 10A, multiple DL beams carrying DL reference signal, DL_RS, are swept from the TRP or gNB at step 1A, and at step 1B, a UE selects a best beam based on the measurements of the DL reference signal DL_RS_m, such as PSS/SSS in SSB burst or periodic CSI-RS, carried on the DL beam DLTX_m, and then the DL path loss is calculated with the Reference Signal Received Power (RSRP) or Received Signal Strength Indicator (RSSI) or Channel Quality Indicator (QCI) measured with DL_RS_m, as an example: $L_{DLpath}$=referenceSignalPower−RSRP DL_RS_m. At step 2, the UE reports the best beam DLTX_m to the TRP or gNB. At step 3, the TRP or gNB calculates the UL path loss or UL transmit power adjustment based on the measurement of the received reference signal, e.g., RSRP of UL-RS such as sound reference signal (SRS) on UL. At step 4B, the UE may make adjustment with the Beam Pair Link Gain $\Delta_{bpl}$ to its UL power control based on the path loss estimation with DL_RS_m, as well as $L_{ULpath}$ (calculated UL path loss), $UL_{adj}$ (UL power control adjustment), or TPC (UL power control command, i.e. increasing or decreasing the UL power) feedback from the TRP or gNB. This $\Delta_{bpl}$ is related to the selected DL_RS_M and the beam pair selected and can be used hereafter for adjust the UL transmit power for the associated beam pair.

Figure 10B:
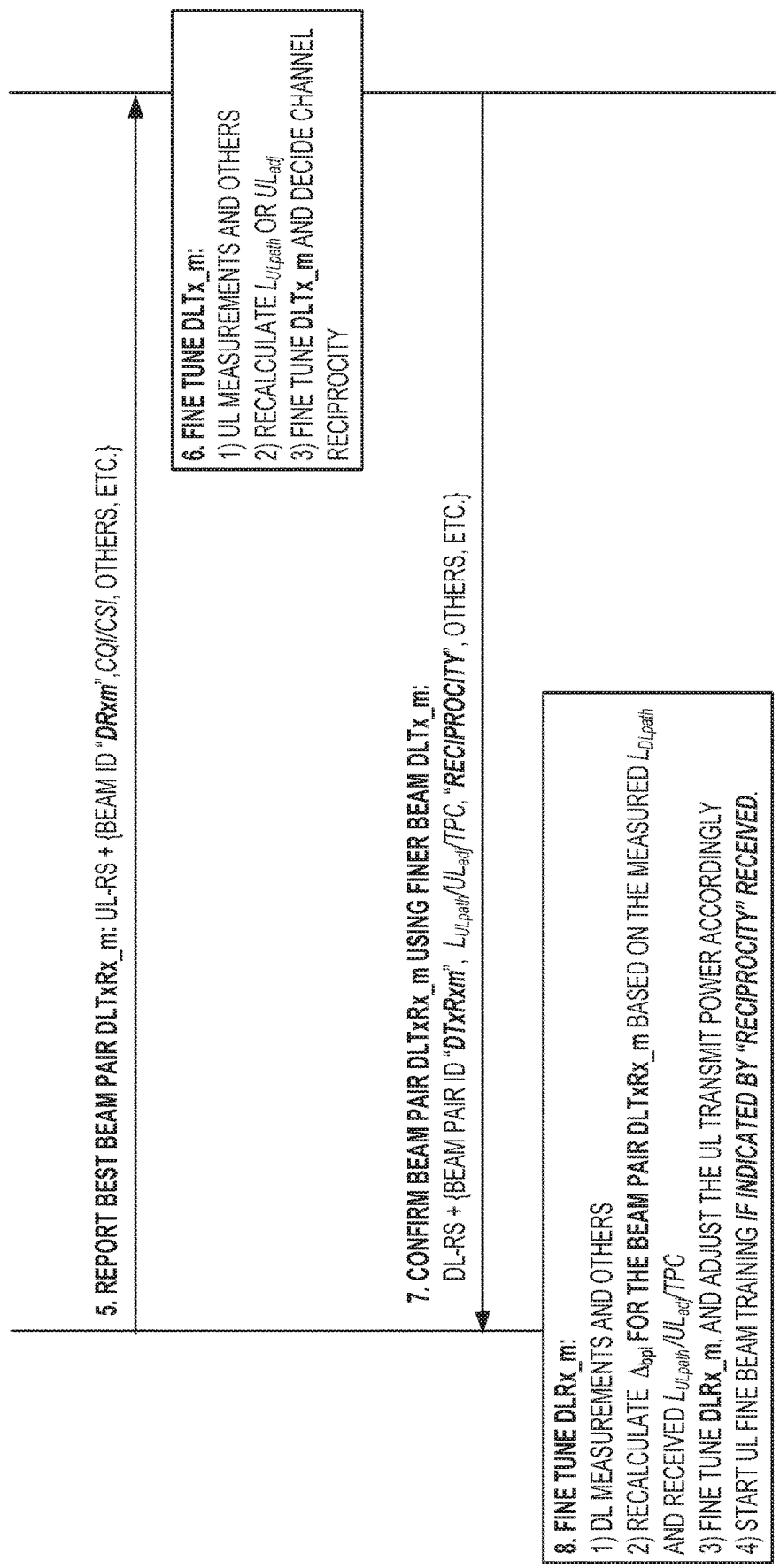

In FIG. 10B, at step 5, the UE reports the best beam pair DLTXRX_m to the TRP or gNB. At step 6, the TRP or gNB calculates the UL path loss or UL transmit power adjustment based on the measurement of the received reference signal, e.g., RSRP of UL-RS such as SRS on UL. At step 7, the UE receives a confirmed beam pair DLTXRX_m user a finer beam DLTX_m. At step 8, the UE fine tunes the DLRx_m. In this step, the UE performs DL measurements. It recalculates $\Delta_{bpl}$ for the beam pair DLTXRX_m based on the measured $L_{DLpath}$ and received $L_{ULpath}/L_{adj}$/TPC. Next, the UE fine tunes the DLRX_m and adjusts the UL transmit power accordingly. Last, the UE starts the UL fine beam training. The $\Delta_{bpl}$ is related to the selected DL_RS_M and the beam pair selected and can be used hereafter for adjust the UL transmit power for the associated beam pair.

Figure 11A:
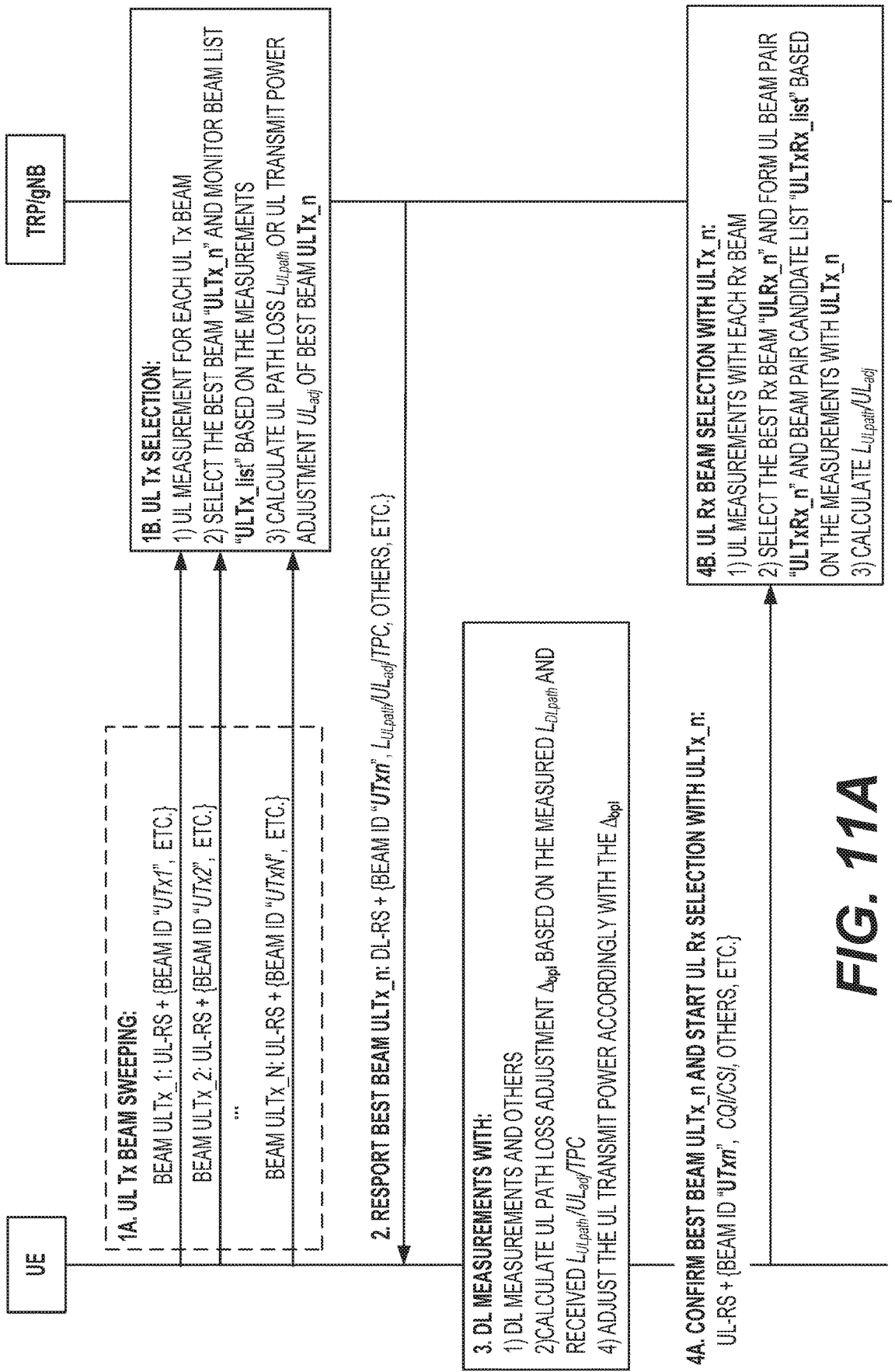
FIGS. 11A and 11B illustrate an estimation of a beam pair link gain difference during uplink beam training or pairing.
Figure 11B:
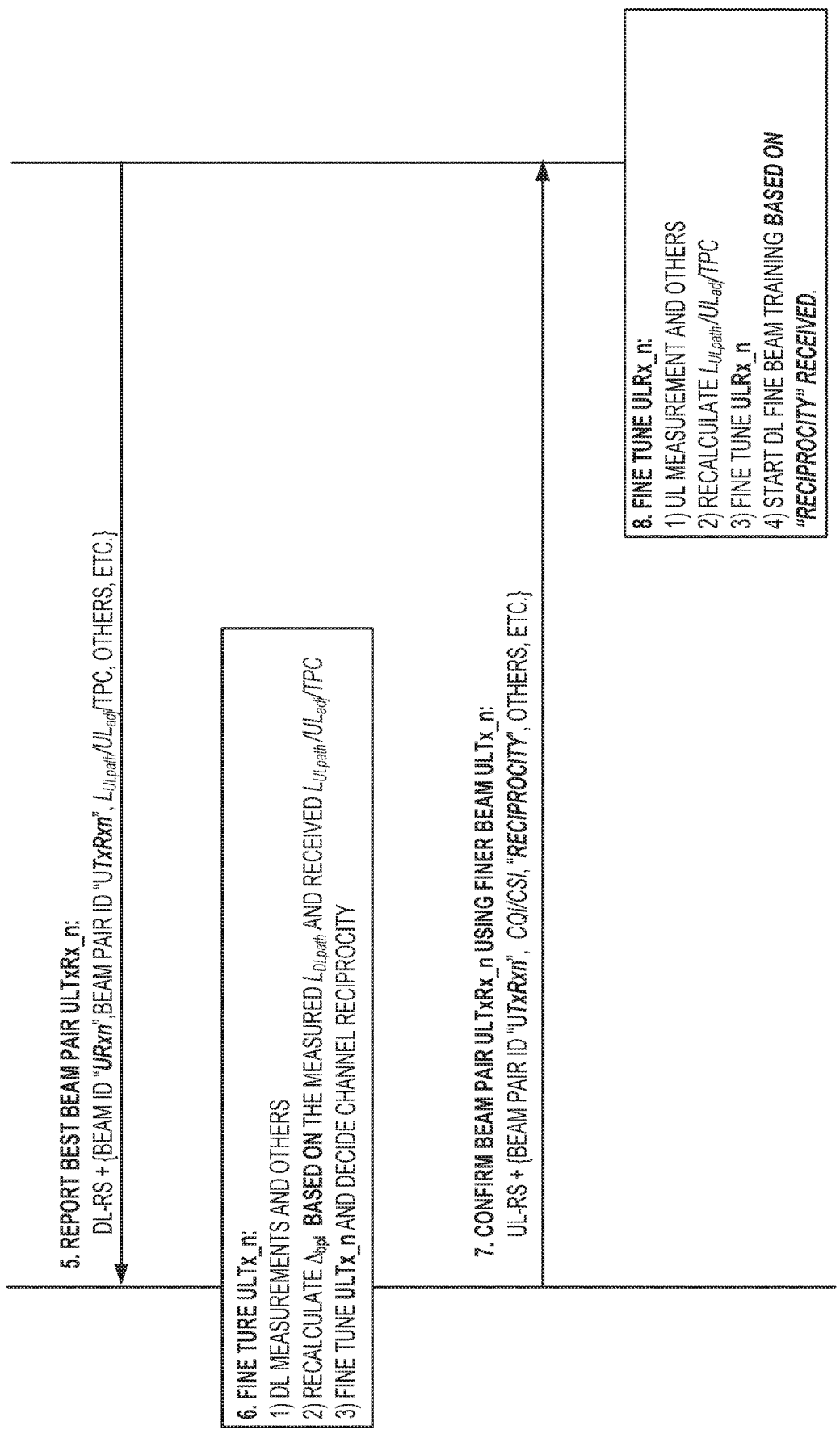

FIGS. 11A and 11B as a whole estimate beam pair link gain difference during uplink beam training or pairing. In FIG. 11A, at step 1A, a UE sends UL beams with the initial power setting related to the UL RS_n, such as SRS (n), carried on ULTx_n. At step 3, the UE may make an adjustment with the Beam Pair Link Gain $\Delta_{bpl}$ its UL power control based on the path loss estimation with DL_RS_n carried on selected best beam ULTx_n, as well as $L_{ULpath}$ (calculated UL path loss), $UL_{adj}$ (UL power control adjustment), or TPC (UL power control command, i.e. increasing or decreasing the UL power) feedback from the TRP or gNB. At step 4A, the UE confirms the best beam ULTx_n and starts UL Rx selection with ULTX_n. The $\Delta_{bpl}$ is related to the selected DL_RS_n and the beam pair selected and can be used hereafter for adjust the UL transmit power for the associated beam pair.

In FIG. 11B, at step 5, the UE receives a report of the best beam pair ULTxRX_n. At step 6, the UE fine tunes the ULTx_n. In this step, the UE performs DL measurements. It recalculates $\Delta_{bpl}$ for the beam pair based on the measured $LD_{Lpath}$ and received $L_{ULpath}/L_{adj}$/TPC. Next, the UE fine tunes the ULTx_n and decides channel reciprocity. At step 7, the UE confirms the beam pair ULTxRx_n using finer beam ULTx_n. The $\Delta_{bpl}$ is related to the selected DL_RS_n and the beam pair selected and can be used hereafter for adjust the UL transmit power for the associated beam pair.

Figure 12:
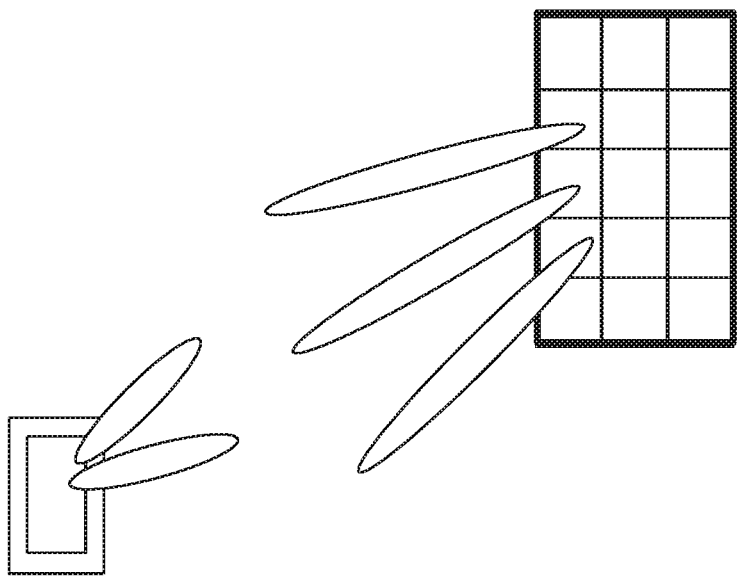
FIG. 12 illustrates a graphical user interface for a beam pair link measurement.

According to a further embodiment, FIG. 12 provides an exemplary user GUI for beam pair link measurements. The beam pair link measurements may be displayed in either text and/or graph form. This may be used to help a user to operate the handheld device properly and avoid unnecessary blockage at very high frequencies, such as at the mmWave frequency band.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows. The computer executable instructions may be stored in a memory and executed by a processor disclosed above in FIGS. 1C and 1F, and employed in devices including a node such as for example, end-user equipment. In particular, the UE as shown for example in FIGS. 1B and 1E is configured to perform the instructions of beam link pairing the apparatus to the router in new radio. The instructions may include: (i) transmitting physical random access channel (PRACH) preambles through a set of uplink transmission beams in a subframe; (ii) signaling a beam ID of the set of uplink transmission beams; (iii) monitoring a physical downlink control channel (PDCCH) for a random access response (RAR) including a random access radio network temporary identifier (RA-RNTI); and (iv) determining the RA-RNTI corresponds to the transmitted PRACH preambles.

In yet another embodiment, the UE as shown for example in FIGS. 1B and 1E is configured to perform the instructions of beam link adjustments in the new radio. The instructions may include: (i) detecting downlink transmission beams transmitted from a gNB; (ii) performing downlink measurements with downlink reference signals on the detected downlink transmission beams; (iii) selecting an first downlink transmission beam based on the measurement; (iv) calculating a downlink path loss using a downlink reference signal of the first downlink transmission beam; (v) estimating an initial uplink transmit power based on the calculated downlink path loss; and vi) transmitting, to the gNB, an indication of the first downlink transmission beam with the estimated initial uplink transmit power.

In yet a further embodiment, the UE as shown for example in FIGS. 1B and 1E is configured to perform the instructions of beam link adjustments in the new radio. The instructions may include: (i) sending, to the gNB, uplink transmission beams via uplink transmission beam sweeping with an initial uplink transmit power; (ii) receiving, from the gNB, an indication of a first uplink transmission beam from the sent uplink transmission beams, and an uplink path loss or uplink transmit power adjustment information; (iii) calculating a beam pair link gain difference based on a downlink path loss and the received uplink path loss or uplink transmit power adjustment information; and (iv) adjusting the initial uplink transmit power based upon the calculation While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus comprising:
    a non-transitory memory including instructions stored thereon for beam link pairing the apparatus to a gNB in a new radio; and
    a processor, operably coupled to the non-transitory memory, capable of executing the instructions of:
        detecting synchronization signal (SS) blocks;
        receiving physical random access channel (PRACH) resource information in master information block (MIB) on physical broadcast channel (PBCH) or system information block (SIB) on secondary PBCH (SPBCH), the PBCH indicating a location of the SPBCH, the SPBCH carrying system information indicating the PRACH resource information, the PRACH resource information being exclusively mapped for a group of the SS blocks, the SS blocks including a primary or secondary synchronous sequence and the PBCH;
        transmitting PRACH preambles through a set of uplink transmission beams in a subframe including the group of SS blocks, the PRACH preambles being obtained from the PRACH resource information;
        determining the apparatus is in a radio resource control (RRC) connected state;
        participating, while in the RRC connected state, in beam training with the gNB via configured channel state information reference signals (CSI-RS); and
        then participating in beam refinement with the gNB.

2. The apparatus of claim 1, wherein the apparatus is further configured to:
    monitor a physical downlink control channel (PDCCH) for a random access response (RAR) including a random access radio network temporary identifier (RA-RNTI); and
    determine the RA-RNTI corresponds to the transmitted PRACH preambles.

3. The apparatus of claim 1, wherein the PRACH preambles are obtained based on beam ID associated with the group of SS blocks.

4. The apparatus of claim 1, wherein the SS blocks and the set of uplink transmission beams are separated by a gap.

5. The apparatus of claim 1, wherein a set of PRACH resources mapped to the SS blocks correspond to a beam in a downlink for initial access.

6. The apparatus of claim 5, wherein the PRACH resources are semi-statically configured by the gNB.

7. The apparatus of claim 1, wherein the PRACH preambles include a preamble part and a message part.

8. The apparatus of claim 7, wherein a beam ID is signaled in the message part.

9. The apparatus of claim 1, wherein the PRACH preambles are swept through a set of potential uplink transmission beams.

10. The apparatus of claim 1, wherein a random access resource (RAR) includes an uplink transmission beam ID feedback of the apparatus.

11. The apparatus of claim 1, wherein the processor is further capable of:
  receiving a multiple set of channel reference information reference signal (CSI-RS) configurations for the beam link pairing; and
  transmitting a single beam report feedback according to the multiple set of CSI-RS configurations.

12. The apparatus of claim 1, wherein the apparatus is a smartphone, wearable device, tablet or laptop.

13. An apparatus comprising:
  a non-transitory memory including instructions stored thereon for beam link pairing the apparatus to a UE in a new radio; and
  a processor, operably coupled to the non-transitory memory, capable of executing the instructions of:
    transmitting physical random access channel (PRACH) resource information in master information block (MIB) on physical broadcast channel (PBCH) or system information block (SIB) on secondary PBCH (SPBCH), the PBCH indicating a location of the SPBCH, the SPBCH carrying system information indicating the PRACH resource information, the PRACH resource information being exclusively mapped for a group of synchronous signal (SS) blocks, the SS blocks including a primary or secondary synchronous sequence and the PBCH;
    receiving PRACH preambles through a set of uplink transmission beams in a subframe including the group of SS blocks, the PRACH preambles being obtained from the PRACH resource information;
    determining the UE is in a radio resource control (RRC) connected state;
    participating in beam training with the UE being in the RRC connected state via configured channel state information reference signals (CSI-RS); and
    then participating in beam refinement with the UE being in the RRC connected state.

14. A wireless communication method for beam link pairing with a UE, the wireless communication method comprising:
  transmitting physical random access channel (PRACH) resource information in master information block (MIB) on physical broadcast channel (PBCH) or system information block (SIB) on secondary PBCH (SPBCH), the PBCH indicating a location of the SPBCH, the SPBCH carrying system information indicating the PRACH resource information, the PRACH resource information being exclusively mapped for a group of synchronous signal (SS) blocks, the SS blocks including a primary or secondary synchronous sequence and the PBCH;
  receiving PRACH preambles through a set of uplink transmission beams in a subframe including the group of SS blocks, the PRACH preambles being obtained from the PRACH resource information;
  determining the UE is in a radio resource control (RRC) connected state;
  participating in beam training with the UE being in the RRC connected state via configured channel state information reference signals (CSI-RS); and
  then participating in beam refinement with the UE being in the RRC connected state.

\* \* \* \* \*